United States Patent [19]

Dottor et al.

[11] 4,226,348
[45] Oct. 7, 1980

[54] AUTOMOBILE TRUNK CONTAINED GROCERY BAG HOLDER

[76] Inventors: Frank A. Dottor; Shirley E. Dottor, both of 30000 Maplegrove, St. Clair Shores, Mich. 48082

[21] Appl. No.: 835,427

[22] Filed: Sep. 21, 1977

Related U.S. Application Data

[63] Continuation-in-part of Ser. No. 721,823, Sep. 9, 1976, abandoned, and Ser. No. 759,252, Jan. 13, 1977, abandoned.

[51] Int. Cl.² .............................................. B60R 5/04
[52] U.S. Cl. .............................. 224/42.42; 217/12 R; 220/6
[58] Field of Search ................. 224/3, 42.01, 42.03 R, 224/42.03 A, 42.42 R, 42.45 R, 271; 296/37.8, 37.16; 229/15, 42; 217/13, 15; 220/4 R, 4 F, 6, 7, 22; 211/72

[56] References Cited

U.S. PATENT DOCUMENTS

| | | | |
|---|---|---|---|
| 1,202,985 | 10/1916 | Fogg | 229/42 |
| 1,967,506 | 7/1934 | Harrison | 220/6 |
| 2,789,742 | 4/1957 | De Salvo | 224/3 |
| 2,832,498 | 4/1958 | Parsons | 224/42.42 R |
| 3,514,030 | 5/1970 | Carroll | 217/15 X |
| 3,632,010 | 1/1972 | Marty, Sr. | 220/6 |
| 3,675,808 | 7/1972 | Brink | 220/7 |
| 3,800,990 | 4/1974 | Richardson | 224/42.42 R |
| 3,913,774 | 10/1975 | Vajtay | 220/4 R |
| 3,986,656 | 10/1976 | November | 229/15 |
| 3,986,659 | 10/1976 | Vajtay | 220/4 R |
| 4,029,244 | 6/1977 | Roberts | 224/42.42 R |
| 4,047,686 | 9/1977 | Porter | 224/42.45 R |

FOREIGN PATENT DOCUMENTS

| | | | |
|---|---|---|---|
| 1337862 | 4/1962 | France | 220/4 F |
| 2233237 | 1/1975 | France | 220/6 |

*Primary Examiner*—Trygve M. Blix
*Assistant Examiner*—Winston H. Douglas

[57] ABSTRACT

Relates to collapsible grocery bag holders for installation in automobile trunk compartments. Different forms of the invention are illustrated and described herein. In general, they are composed of longitudinally extending side wall members pivotally mounted for folding into a flat compact unit, crossing dividers so designed as to grip the opposing side walls and firmly hold them in spaced apart vertical relationship to form a group of upward opening grocery bag compartments, living hinges for both side wall panels and dividers, and base or bottom members for underlying the grocery bag compartments which are provided with unbroken ridges extending around the perimeter of the base members to prevent escape of liquid or comminuted material from broken grocery packages beyond the confines of the base members. In one form of the invention, the base or bottom member of the bag holder is detachably secured to the floor of the automobile trunk compartment, and the side panels are connected through hinges to the base member for folding movement from an upright bag holding position to a flat collapsed horizontal position when in non-use. In another form of the invention the bag holder in its flat collapsed condition can be further swung about a horizontal axis to assume a vertical position toward the front end of the trunk compartment thereby exposing the floor of the trunk space for other uses.

7 Claims, 48 Drawing Figures

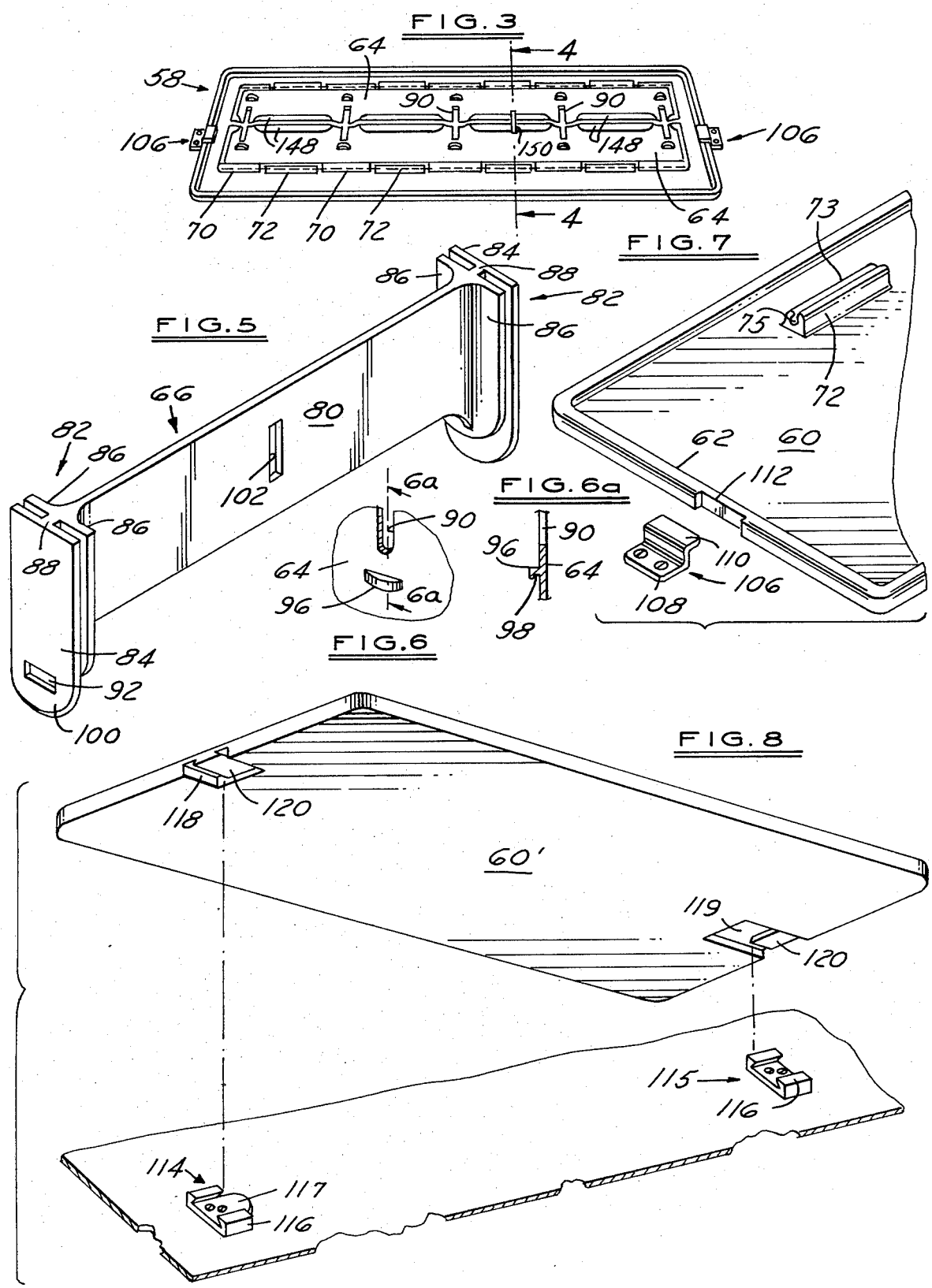

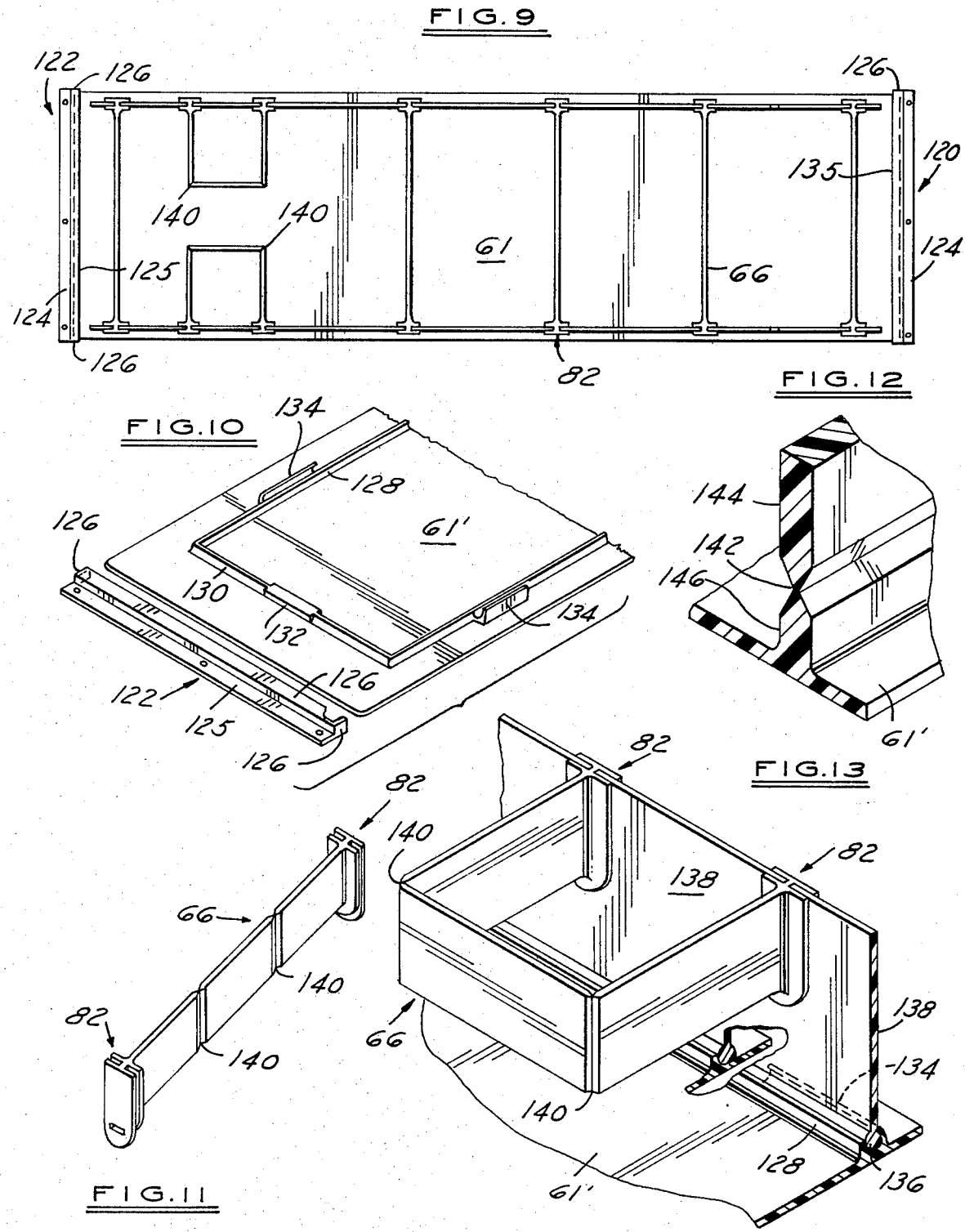

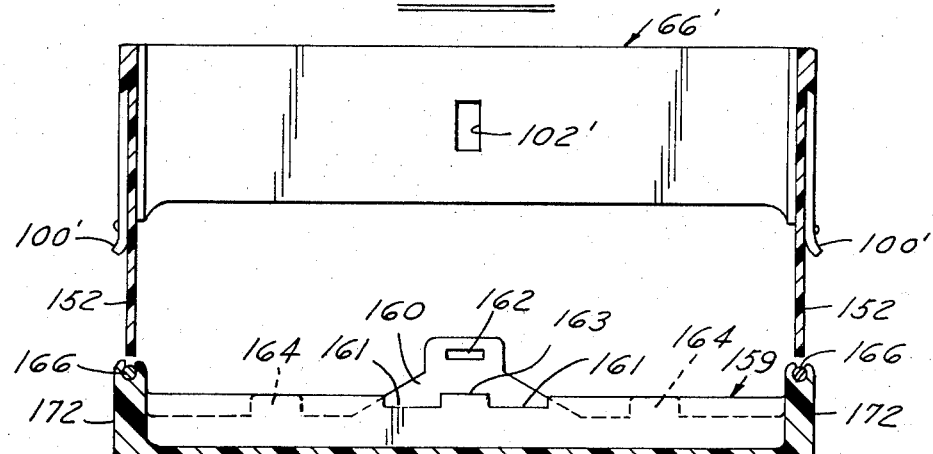
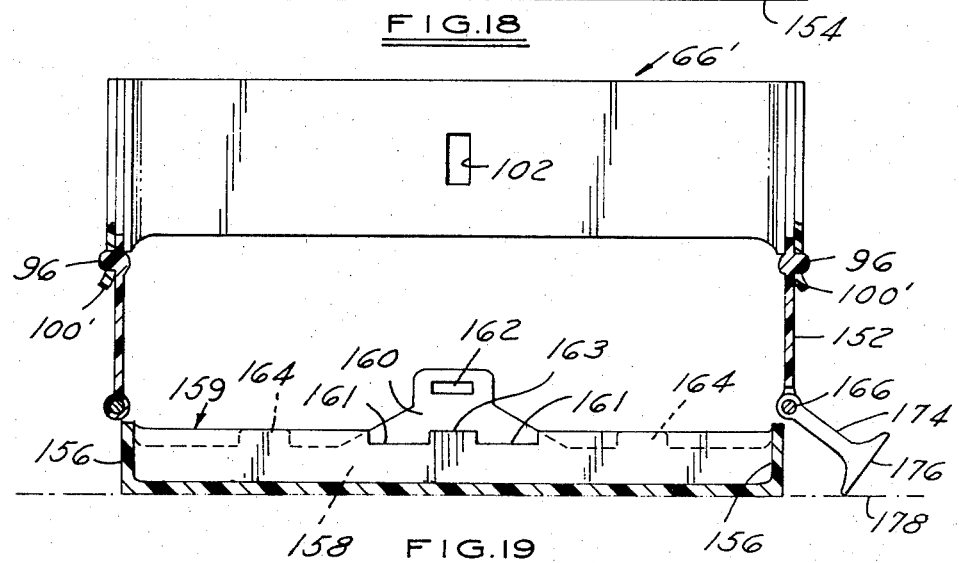
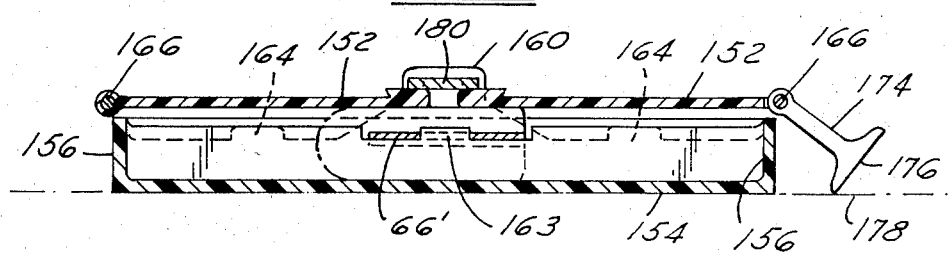
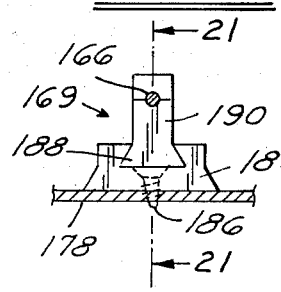
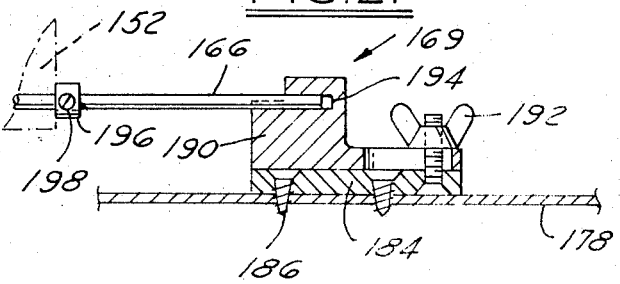

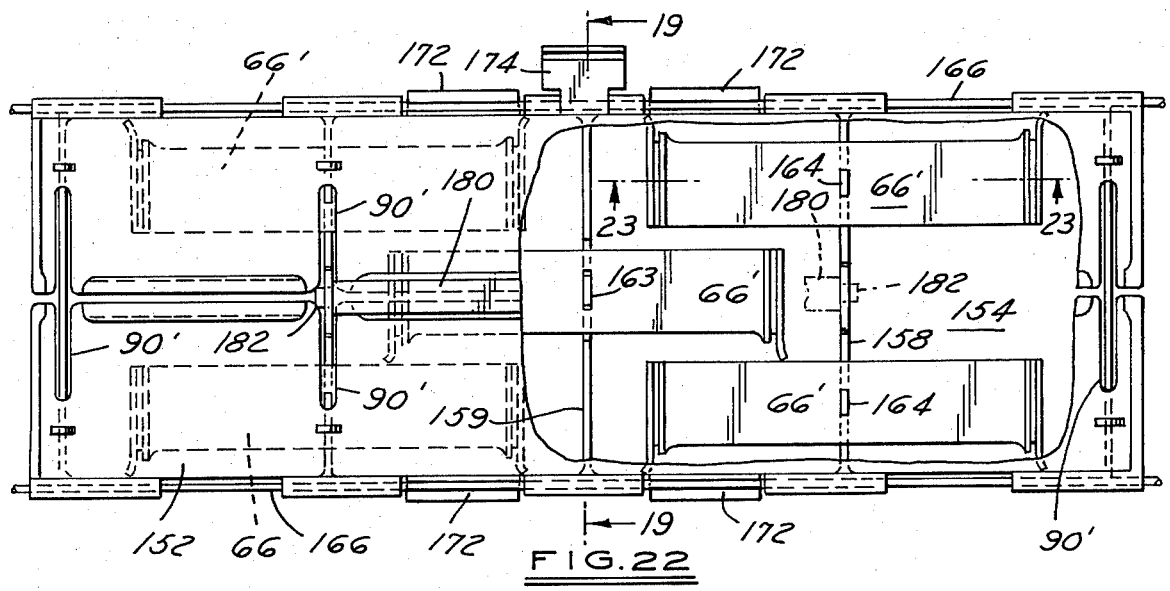
FIG.22
FIG.23
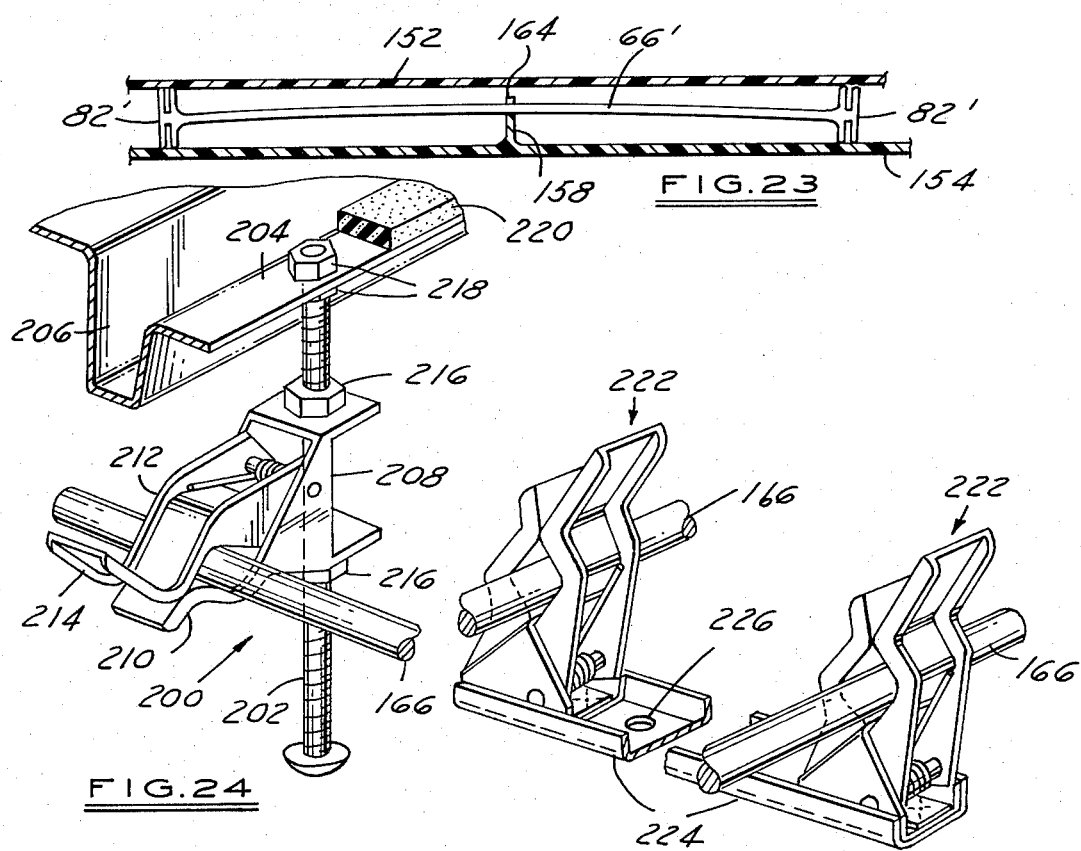
FIG.24
FIG.25

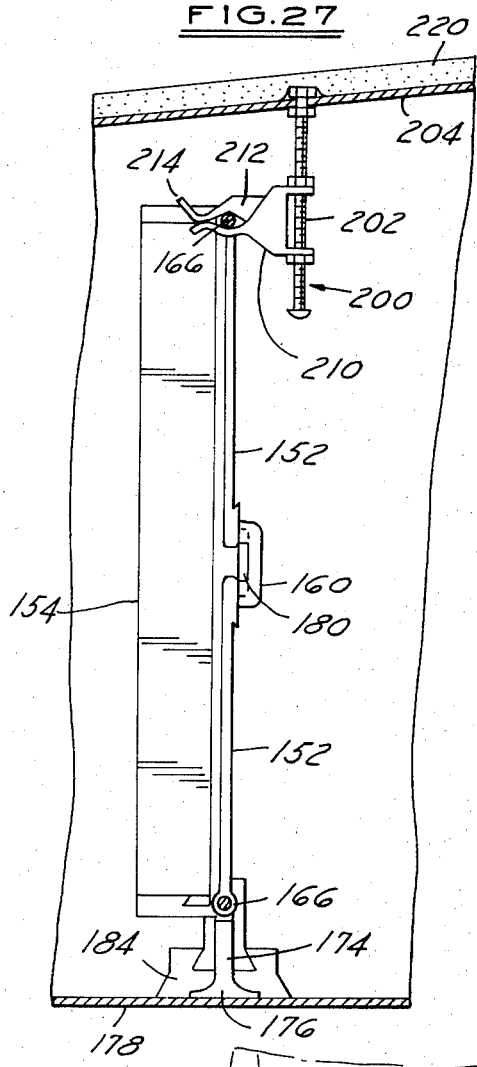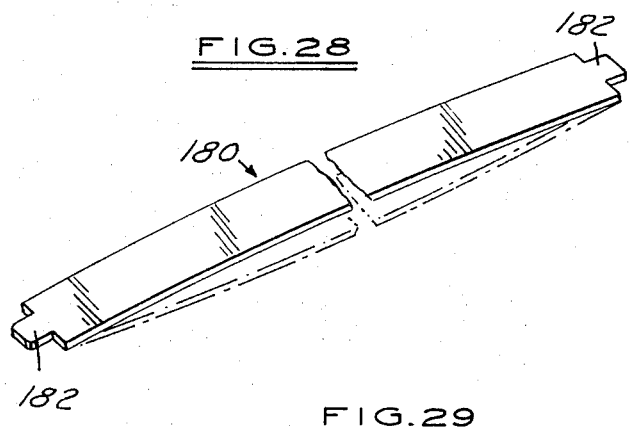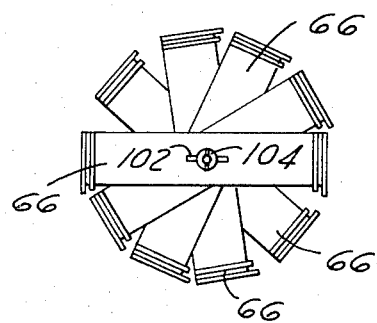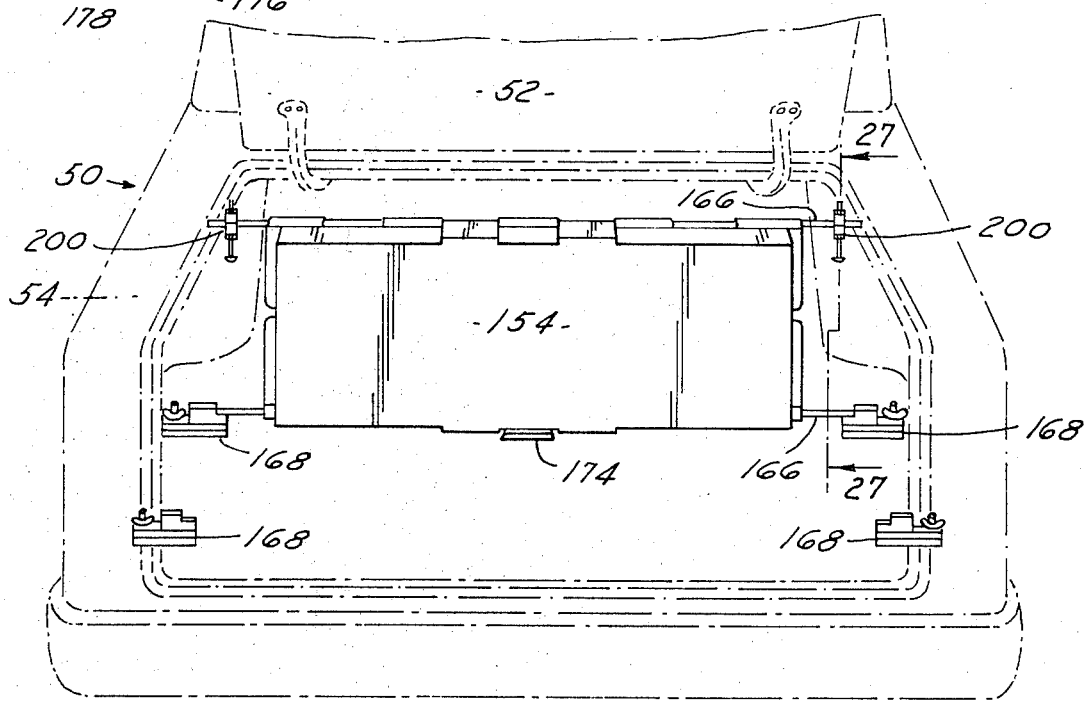

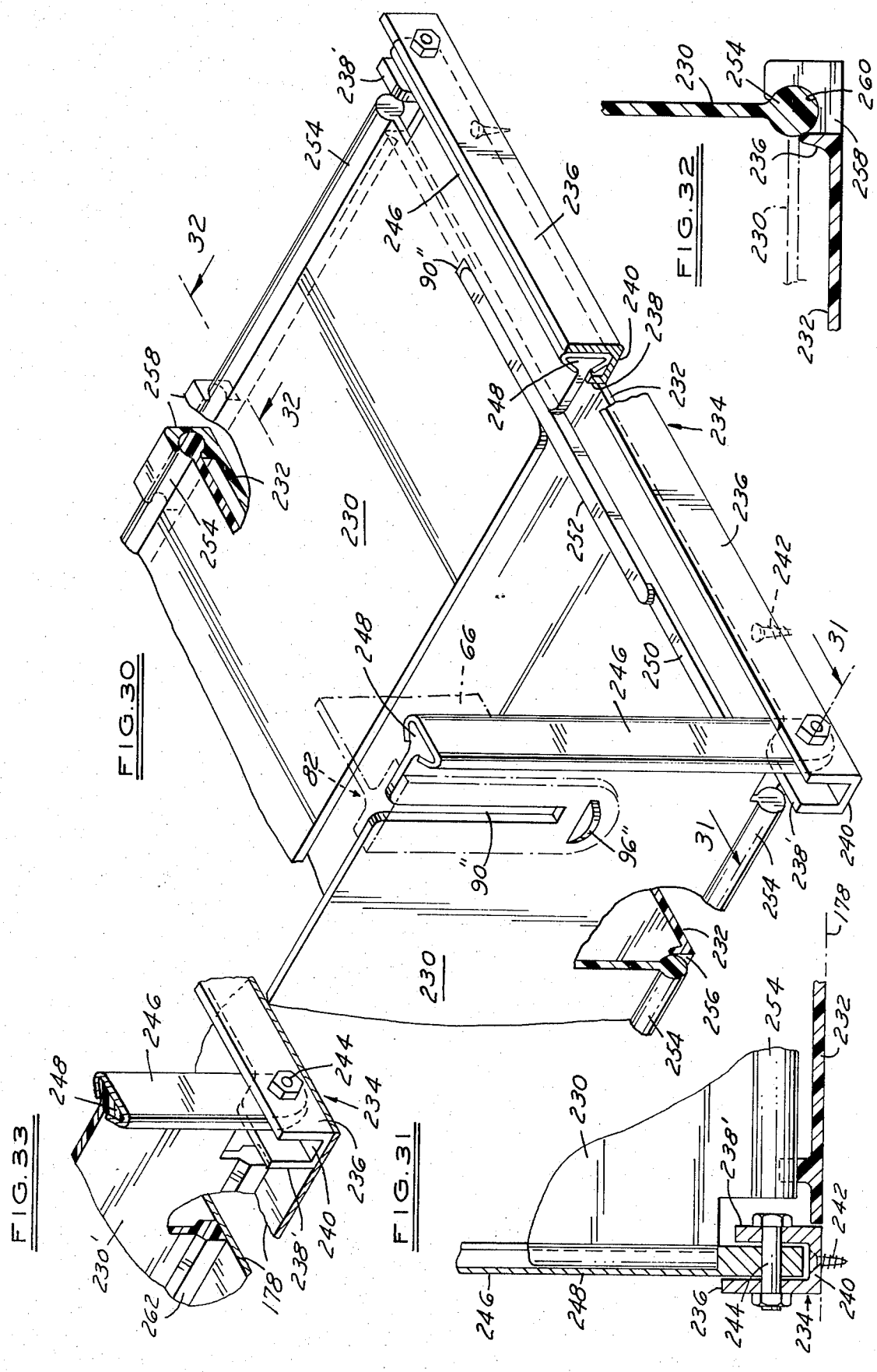

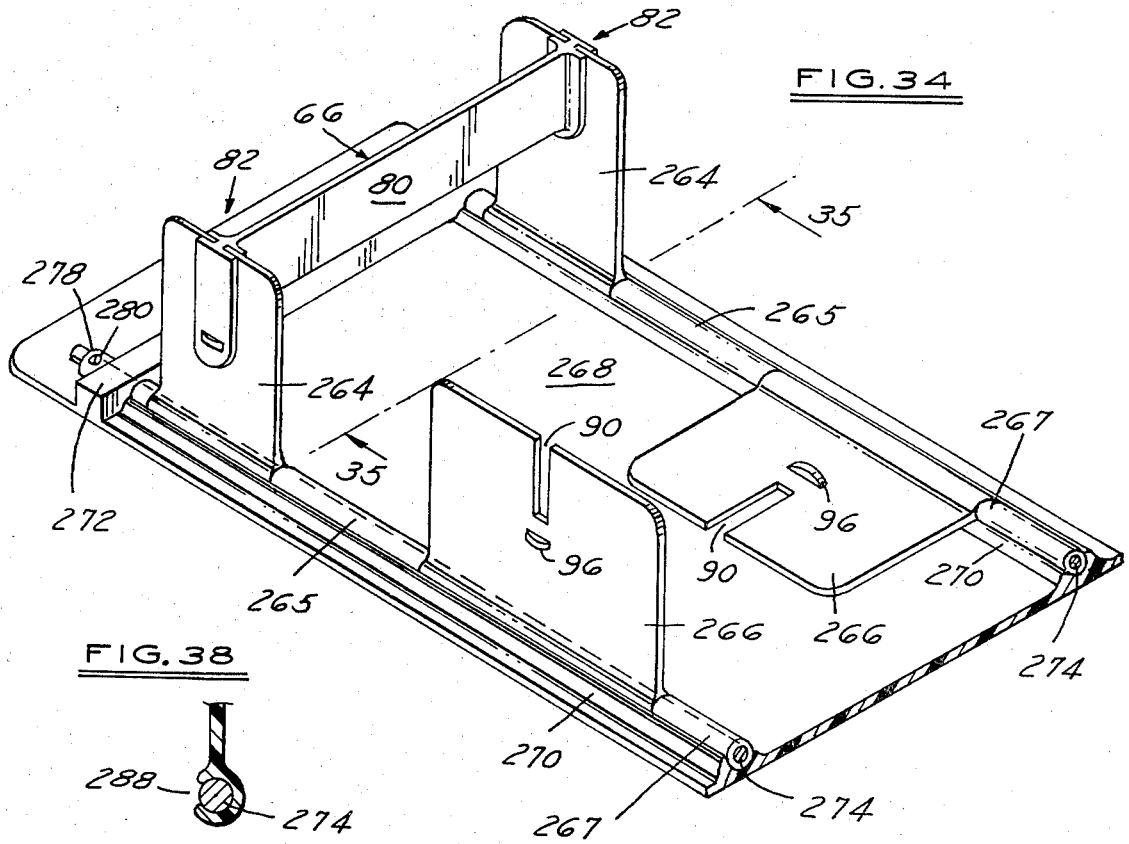
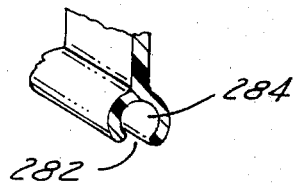
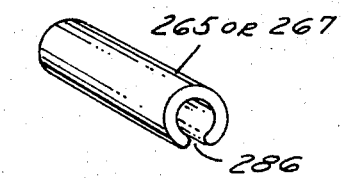
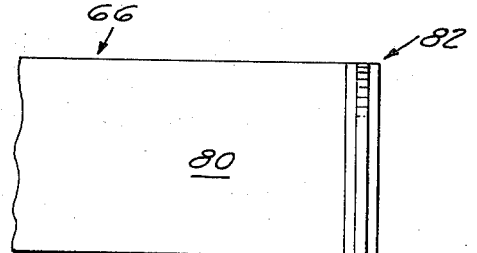
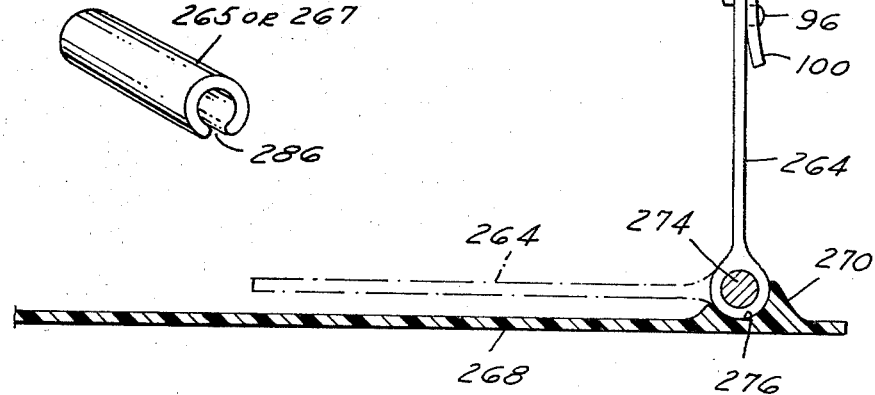

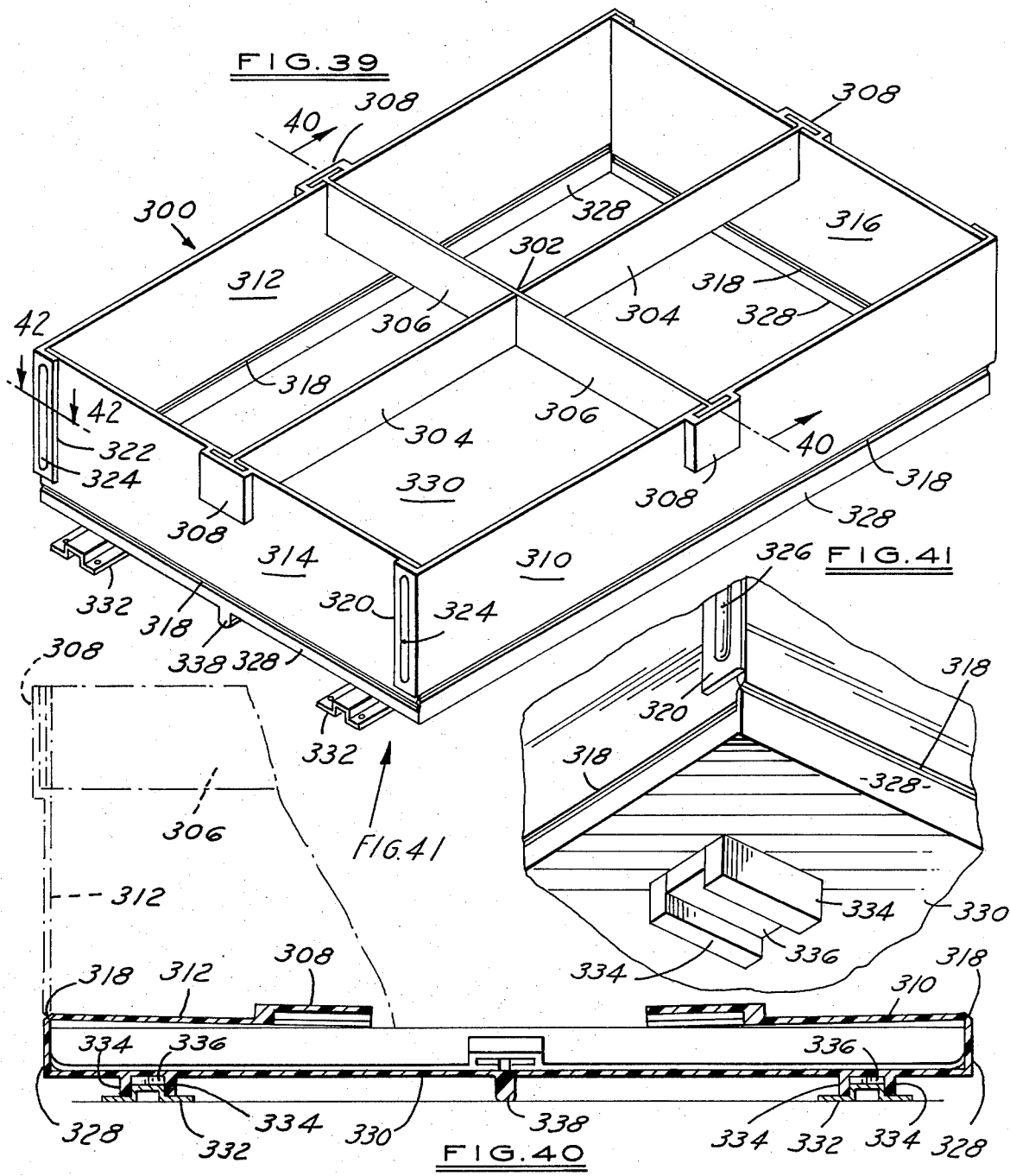

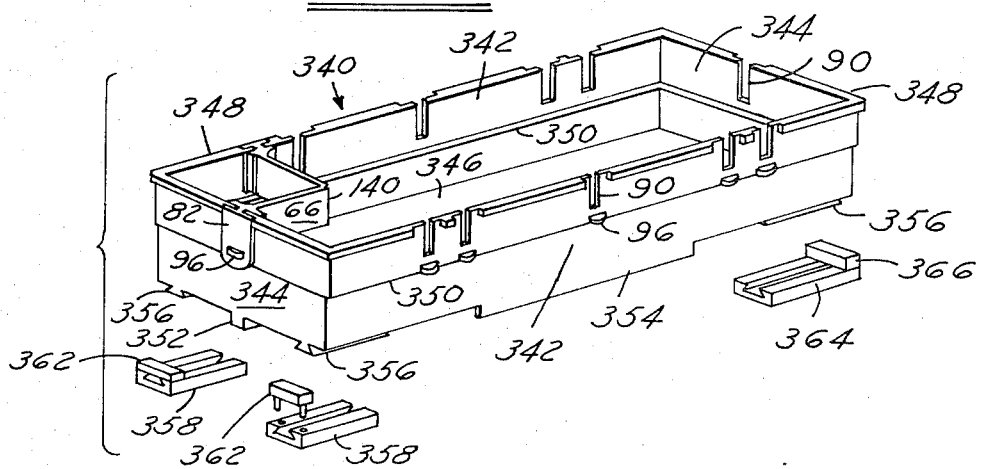
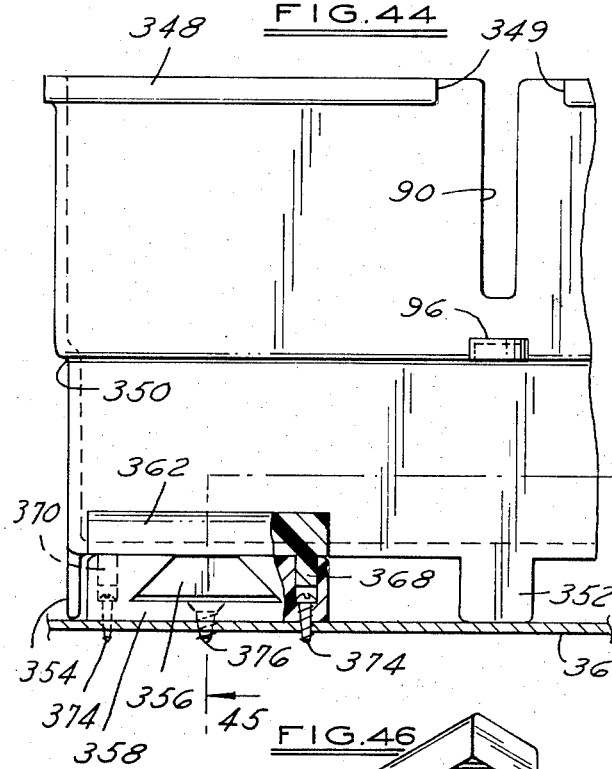
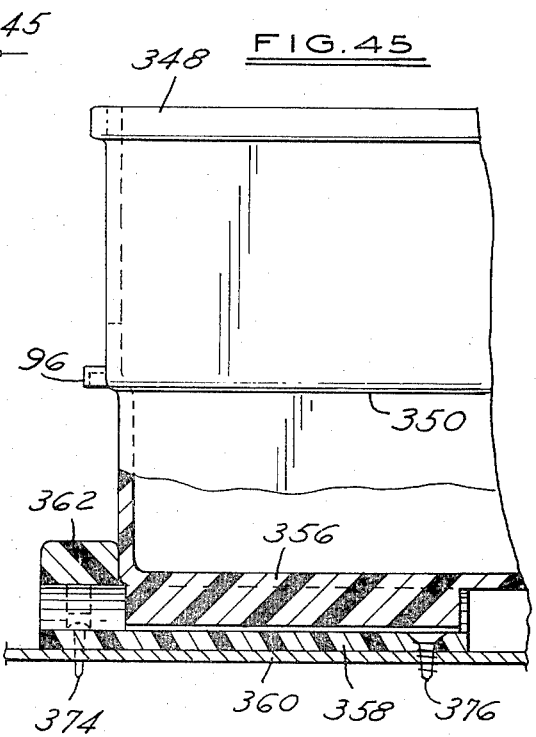
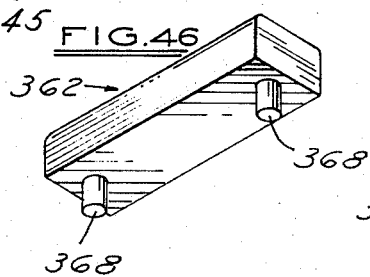
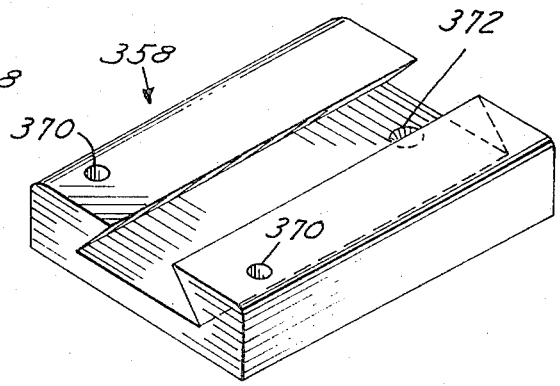

AUTOMOBILE TRUNK CONTAINED GROCERY BAG HOLDER

CROSS-REFERENCE TO RELATED APPLICATIONS

This application is a continuation-in-part of application Ser. No. 721,823, filed Sept. 9, 1976, abandoned and application Ser. No. 759,252, filed Jan. 13, 1977, abandoned.

BACKGROUND OF THE INVENTION

This invention relates to collapsible grocery bag holders for installation in automobile trunk compartments.

Grocery shopping has been a familiar problem to most families for some time and although the automobile has been found convenient for carting the grocery bags home, nevertheless certain problems have arisen in connection with this practice. Simply placing bags of groceries anywhere in the motor vehicle, including the trunk compartment, was not the complete answer to the problems, because sudden stoppages, fast acceleration and quick turns quite frequently produced havoc amoung the grocery bags, which detracted considerably from this otherwise convenient use of the family car. What was needed and found lacking in the prior art was a carefully thought out plan for developing a closely related variety of grocery bag holders all founded on the same basic principles.

SUMMARY OF THE INVENTION

It has been said, and factually it may be believed, that the two primary functions of the present day automobile is first, of course, to transport people and second to transport groceries. The invention, the Automobile Trunk Contained Grocery Bag Holder, relates to the latter and is a substantial improvement over the method and means by which this has been accomplished in the past.

For many years, the automobile manufacturers have provided the means for securing the spare tire and bumper jack in the trunk compartment and now more recently, for safety reasons, they have incorporated the means for securing the driver and passengers in the vehicle with seat belts and shoulder straps, but the need for a method to support and secure items transported in the trunk, most frequently bags of groceries, has been either ignored or obviously not seriously considered.

The Trunk Bag-A-Mat and Tote-A-Bag methods eliminate, once and for all, the bothersome subconscious expectation of hearing, at every stop and turn, the sound of bags of groceries toppling over in the trunk, which is usually followed by a disquieting instant evaluation of the possible damage or mess resulting therefrom.

From personal experience it has been also noted, that the realization of the unsupported bags of groceries in the trunk interferes with our normal driving habits, sometimes to the extent of being reluctant to apply the brakes positively, in effect we tend to "baby" the bags. The Trunk Tote-A-Bag also eliminates the time consuming chore of cleaning out the entire trunk compartment which has been messed and soiled by leaking beverage bottles, milk cartons, broken eggs, and also by hauling bags of sand, dirt, fertilizers, flower pots, cans of gasoline for grass cutters and garden equipment, etc. In the event of this spillage, the products of this invention are easily removed for cleaning, replacement and out-of-the-way securement in the motor vehicle.

In addition to the specific functions of our invention, which is to hold and support bags of groceries in an upright and fixed position and the containment of spilled liquids and comminuted material, we believe it is essential that such a device, to gain consumer acceptance, incorporates certain features, which are included in our design, such as:

(1) while not in use for the intended purpose, but remaining in the trunk, the device can be folded and/or tilted out of the way leaving the trunk compartment, for all practical purposes, unobstructed.

(2) the sizes of the compartments are variable to accommodate larger of smaller items.

(3) grocery bags can be easily secured in, and removed from, the trunk compartment.

(4) the grocery bag holders are readily adaptable to motor vehicle luggage compartments of different sizes and shapes.

(5) uncomplicated initial installation of anchoring brackets which in turn engage and secure the grocery bag holders.

BRIEF DESCRIPTION OF THE DRAWING FIGURES

Various other objects, advantages and meritorious features of the invention will become more fully apparent from the following specification, appended claims and accompanying drawing sheets wherein:

FIG. 1 is a perspective view in dashed and dotted outline of the rear end of a conventional automobile with the lid of the trunk in raised position exposing the interior of the trunk to view and showing in full lines the mounting of an embodiment of the invention, sometimes referred to herein as the Bag-A-Mat holder, in operable condition for receiving filled grocery bags and the like and for supporting the same in upright position in the trunk;

FIG. 3 is a perspective view of the embodiment of the invention illustrated in FIG. 1 showing the side panels of the grocery bag holder in collapsed inoperable position;

FIG. 5 is an enlarged perspective view of one of the H-type of divider used in the embodiment of the invention illustrated in FIGS. 1 and 2;

FIG. 6 is a fragmentary perspective view of one of the interlocks provided on each side panel for resisting accidental removal of the dividers from the side panels;

FIG. 6a is a detail sectional view taken along line 6a—6a of FIG. 6 showing the shape of the end of each interlocking provision of FIG. 6;

FIG. 7 is a partial perspective view of the mat portion of the grocery bag holder showing one of the hinge knuckles carried by the mat for pivoting the side panels as well as one form of floor hold-down for the mat;

FIG. 8 is an exploded perspective view showing one form of interlock for holding the mat down on the floor of the automobile trunk compartment;

FIG. 9 is a top plane view of a slightly modified form of the invention for holding grocery bags and showing multi-size compartments for such purpose;

FIG. 10 is a perspective view of one end portion of the mat and hold-down device for the embodiment illustrated in FIG. 9;

FIG. 11 is a perspective view illustrating one of the compartment dividers of FIG. 9 containing two living hinges;

FIG. 12 is an enlarged detail perspective view illustrating a live hinge provision of one of the side panels of the embodiment illustrated in FIG. 9;

FIG. 13 is a perspective view illustrating how the divider shown in FIG. 11 may be folded upon itself at the living hinges to form a smaller grocery bag compartment;

FIG. 17 is a vertical cross sectional view taken along line 17—17 of FIG. 14;

FIG. 18 is a vertical cross sectional view taken along line 18—18 of FIG. 14;

FIG. 19 is a vertical cross sectional view taken along line 19—19 of FIG. 22 but showing the side panels folded down into collapsed inoperable position preparatory to being swung as a unit to the position assumed in FIGS. 26 and 27.

FIG. 20 is an end view of an adjustable fixture for supporting one end of a pivot rod about which each side panel swings;

FIG. 21 is a longitudinal section view of the fixture illustrated in FIG. 20 and taken along line 21—21 thereof;

FIG. 22 is a top plane view of the grocery bag holder of FIG. 14 partially broken away in section and showing the disposition of the parts of the holder in folded and interlocked position when in non-use;

FIG. 23 is a cross sectional view taken along line 23—23 of FIG. 22;

FIG. 24 is an enlarged perspective view of one of the hinge rod engaging clips suspended from the channel member of the automobile trunk which receives the hood of the trunk;

FIG. 25 is a view illustrating the use of spring clips in lieu of the fixtures of FIGS. 20 and 21 for gripping the pair of fore and aft hinge rods;

FIG. 26 is an underside view of the grocery bag holder of FIG. 14 showing it in a collapsed forwardly folded position in the trunk compartment of the automobile;

FIG. 27 is a side view of the collapsed grocery bag holder in its forwardly swung position taken along line 27—27 of FIG. 26;

FIG. 28 is a perspective view of the tension bar for holding down the folded side panels;

FIG. 29 is a suggested floral arrangement for storing the compartment dividers on the interior surface of one of the quarter panels of the trunk;

FIG. 30 is a perspective view, partially cut away in section, illustrating another embodiment of the invention wherein pivotal mounts rather than hinges are employed to swing the side panels relative to the base member;

FIG. 31 is an enlarged detail section view of one of the pivotal mountings taken along line 31—31 of FIG. 30;

FIG. 32 is an enlarged detail sectional view of another form of pivotal mounting taken along line 32—32 of FIG. 30;

FIG. 33 is an enlarged detail view of still another form of pivotal mounts;

FIG. 34 is a perspective view of another embodiment of the invention employing a multiplicity of different sized spacers and panels each individually hinged to the base member of the assembly to make up compartments for holding filled grocery bags of different sizes;

FIG. 35 is an enlarged detail view of one of the hinged connections between panels and base member and taken along line 35—35 of FIG. 34;

FIGS. 36 and 37 show two different forms of metal clasps on margin of base member which are shaped to embrace a metallic hinge pin upon which the panels swing;

FIG. 38 illustrates still another form of hinge mounting for the panels;

FIG. 39 is a perspective view of still another embodiment of the invention wherein the dividers criss cross one another to form a cluster of compartments for receiving filled grocery bags;

FIG. 40 is an enlarged cross sectional view of the bag holder of FIG. 39 taken along line 40—40 thereof and showing in dashed lines the upright position of the side panels and in solid lines the folded collapsed position of the side panels as a result of their turning movement on living hinges molded therein;

FIG. 41 is an underside perspective view of the holder of FIG. 39 illustrating the use of magnets for restraining both sidewise and vertical movement of the holder; and FIG. 42 is an enlarged sectional view taken along line 42—42 of FIG. 39 and showing the provision for releasable locking the corners of the bag holder from separation.

FIG. 43 is an exploded perspective view of another grocery bag holder which incorporates certain features previously disclosed herein yet permanently exhibiting a box-like shape installable and removable as a unit on corner mountings fixed to the floor of the automobile luggage compartment;

FIG. 44 is an enlarged side elevation of the holder of FIG. 43 as viewed at one corner thereof, and partly broken away in section to show certain interior details of the corner mounting;

FIG. 45 is a view similar to FIG. 44 but around the corner and at a right angle thereto taken along line 44—44 thereof and broken away in section to reveal certain details of the interior of the corner mounting;

FIG. 46 is an underside perspective view of one of the removable locking blocks for a corner mounting; and FIG. 47 is a topside perspective view of one of the corner mounting blocks showing the dove-tailed formed therein for slidably receiving a complementary fitting part on the underside of the grocery bag holder of FIG. 43.

DESCRIPTION OF PREFERRED EMBODIMENTS

Figure 1:
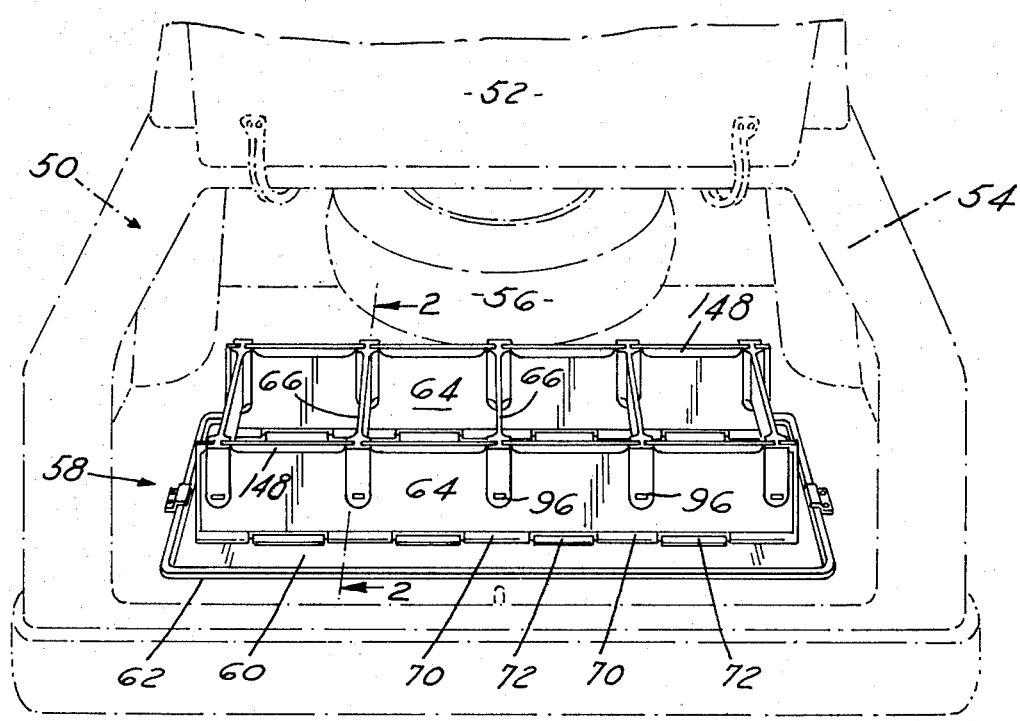

Attention is directed to the embodiment of the invention and certain minor variations therein which are illustrated in FIGS. 1 to 13 inclusive. The intended environment of this first embodiment is the trunk space or compartment occupying the rear end of a conventional automobile represented in dot-dash outline in FIG. 1 and generally identified by reference character 50. The trunk opening is normally closed by a lid 52 hinged for swinging movement to the underside of the deck 54 and is shown in fully opened position in FIG. 1. A spare tire 56 is shown in the usual forward position in the trunk compartment.

Between the spare tire 56 and the rear end of the vehicle a fairly large floor space is provided in the trunk which is used for carrying luggage but more frequently in recent years to carry groceries and other purchases made at local markets. Occupying a large part of this space in FIG. 1, there is shown an embodiment of the invention generally indicated at 58 which is sometimes referred to herein as the Bag-A-Mat holder or device. The holder includes a somewhat flexible base member or mat 60 of rectangular shape having an unbroken ridge 62 extending completely therearound as better shown in FIGS. 2, 4 and 7. Extending for almost the length of the mat 60 are a pair of similarly shaped side wall members or panels 64—64 which in their operative position as supports for the grocery bags extend upright facing one another in spaced parallel relationship as shown in FIG. 1, wherein the distance in which the side wall members 64—64 are spaced apart is approximately equal to the combined width of the side wall members. Maintaining these wall members 64—64 in their respective upright positions are a plurality of similarly shaped dividers or partitions 66 which as shown in FIGS. 1 and 2 extend crosswise to the side walls 64—64 and intercept the same in the manner to be explained shortly.

Figure 2:
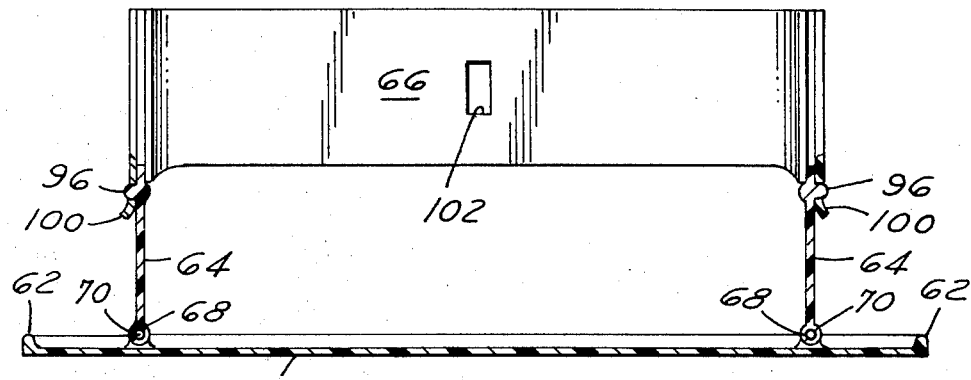
FIG. 2 is an enlarged vertical cross sectional view taken over along line 2—2 of FIG. 1.
Figure 4:
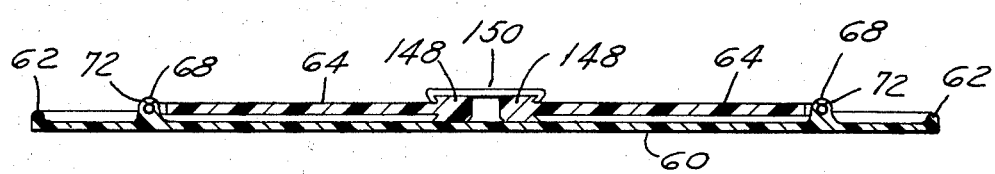
FIG. 4 is an enlarged sectional view taken along line 4—4 of FIG. 3.

Each side wall member 64 is hinged along its lower edge about a horizontal axis to the base member or mat 60 for pivotal movement from its upright position shown in FIGS. 1 and 2 to a folded down or collapsed position shown in FIGS. 3 and 4. The hinge for each side wall member 64 comprises an elongated rod 68 which is enclosed by an alternate series of hinge parts of knuckles 70 associated with the side wall panel 64 and knuckles 72 associated with the mat 60. In the case of the panel knuckles 70 these are integrally molded to the panel, and in the case of mat knuckles 72 these are integrally molded to the mat. When assembling the parts of the Bag-A-Mat holder, the knuckles of the mat and each panel are alternated and axially aligned with one another in the manner illustrated in FIGS. 1 and 3 and the rod 68 is inserted therethrough thus journaling the two panels to the mat for pivotal movement about spaced parallel axes. Preferably, as shown in FIG. 7, the set of hinge parts molded integrally with the bottom member 60 has each hinge knuckle 72 formed with an upwardly opening slot 73 of slightly less width than the diameter of the hinge rod 68. The knuckles 70, however, of each side panel 64 are fully circular and carry the hinge rod therealong while exposing sections of the rod between each adjacent pair of knuckles 70. These exposed sections of the hinge rod are laterally press fitted into the slot 73 of each knuckle 72 to reach the circular bore 75 where it is retained by the partial closure of the slot.

Figure 4A:
FIG. 4a is an enlarged detail view illustrating a modification of the form of hinge for providing the swinging movement of the side panels of the grocery bag holder.

FIG. 4a illustrates a modification of the hinge assembly in which, instead of molding two sets of hinge knuckles 72—72 to the mat 60, a separate strip 74 for each set of hinge knuckles is provided which is recessed into the mat and secured thereto by fastening elements in the form of screws in the manner shown in FIG. 4a. Each strip 74 carries a series of spaced raised hinge knuckles 76 which may be bonded or fastened to the strip and each provided with an aligned bore 78 for receiving the pivot rod 68.

FIG. 5 illustrates the construction of each divider or partition 66 which is used in several of the embodiments of the invention disclosed herein. Each divider 66 comprises an elongated central portion 80 which spans the distance separating the two side walls or panels 64—64 and similarly terminates at its opposite ends in "H" shaped configurations generally indicated at 82—82 which at each end of the divider is formed by two pairs of wings 84—84 and 86—86 connected by a central membrane 88. The two membranes 88—88 form opposite end extensions of the elongated portion 80 and constitute those parts of the divider occupying the slots 90 in the two side wall members 64—64 as shown in FIGS. 6 and 6a but better illustrated in FIGS. 30 and 34. The slots 90 for each divider open out through the upper edges of the two side wall members 64—64 and in the opposite direction extend for a depth of approximately one-half the height of the wall member as shown in FIGS. 30 and 34. Correspondingly, the "H" configuration at each end of the divider 66 is designed to complement the slot 90 in which it is received, that is to say, the membrane 88 extending depth-wise the same distance as the length of the slot so that the top edge of divider terminates flush with the top edge of the side wall members 64—64. Moreover, the spaces between the two pairs of wings 84—84 and 86—86 should equal the thickness of the side wall members 64—64 to firmly grip the same therebetween. In this manner, the dividers 66 will tightly maintain the side wall members 64—64 in upright parallel position to support the grocery bags in upright condition, yet the dividers 66 should be free for quick removal in order to rapidly collapse the grocery bag holder to the flat folded condition shown in FIGS. 3 and 4.

With further reference to FIG. 5, it is to be specially noted that in each "H" configuration at the opposite ends of the divider 66 the outer pair or couplet of wings 84—84 extend further down than their companion inner pair of wings 86—86 and that a short horizontal slot 92 is formed in lower end portion of the outer couplet. When the divider 66 is fully forced down the maximum extent of the two opposing vertical slots 90—90 in the facing panels 64—64, the short horizontally slot 92 of each outer wing couplet 84—84 will be in position to receive a lip 96 protruding from each panel which will resist withdrawal of the divider from the vertical slots 90. The lip 96 is preferably undercut slightly as at 98 in FIG. 6a to improve this interlocking engagement. The lower terminal end of the outer wing couplet 84—84 may be outwardly flared away from each facing panel 64—64 as shown in FIG. 2 in order to form a release tab 100 to facilitate gripping and pulling action with the fingers. A slight downward and outward pull on each release tab 100 will clear the divider from the lips 96 of the side panels 64—64 and enable the divider to be quickly lifted from the side panels and removed from the holder.

The outer wing sections or couplets 84—84 at each end of the H type of divider also serve as lead-in flanges for guiding the membranes of the divider into the upper opened ends of the slots 90—90 of the two panel members 64—64. Depending further than their inner companion wing couplets 86—86, it is possible to quickly install each divider 66 in its respective panel slots 90—90 by shifting the divider back and forth over the open ends of these opposing slots while lowering the divider until one or the other of the release tabs 100—100 strikes the area of the mouth of either slot. At this moment the divider is further lowered while manipulated sidewise in order to introduce the central membrane 88 of the H-shaped configuration into the opened end of the slot 90 first contacted by the tab. Once one end of the divider is received in the mouth of one of the slots 90, it is easy to guide the other end of the divider to the remaining slot 90 for entry thereinto. It is apparent that the release tabs 100—100 double as lead-in flanges for guiding each divider 66 into its opposing pair of slots 90—90.

Centrally located on each divider 66 is a transversely extending slot 102 for storing purposes in the manner shown in FIG. 29. A single bolt and wing nut assembly 104 connects all of the dividers 66 employed in a holder device into a floral arrangement which can be conveniently stored when not in use in a recessed area of the trunk space. Or, the set of dividers for each holder device may be stored in the manner illustrated in FIGS. 22 and 23 where the dividers are spaced about from one another within the confines of the bottom member and the folded down side panels as will be described in more detail hereinafter.

FIGS. 7, 8, and 10 illustrate three different forms of hold-down means for releasably securing the bottom member or pad 60 to the floor of the luggage compartment. In FIG. 7, a pair of similar hold-down devices 106 spaced apart from one another just sufficient to engage the opposite ends of the bottom member 60. Each such device comprises a one-piece member jogged intermediate its ends to exhibit a stepped appearance. One end section 108 is attachable by screws to the floor of the automobile trunk compartment and the other end section 110 overlaps the adjacent end of the bottom member. The intermediate jogged portion of each device is received within a recess or notch 112 at its end of the bottom member. The width of the recess is substantially the same as the width of the device for snug fit therebetween thereby holding bottom member from unwanted movement. As earlier mentioned, the bottom member is flexible to the extent that its opposite ends can be pulled or retracted from under the overlapping section of each device and then re-introduced thereunder.

In FIG. 8 the hold-down means for the bottom member 61 comprises a pair of devices 114 and 115 differing in a minor respect from one another and spaced apart from one another to engage underside areas of the opposite ends of the bottom member. Each such device 114 and 115 comprises a one-piece member having provision as shown for attachment to the luggage compartment floor and is further shaped with a dove-tailed track 116. One device 114 of the two is provided with a flat extension 117 forming a bearing surface to be described. The bottom member 60' has a pair of downwardly opening marginal recesses shown at 118 and 119, the latter differing from the former by being enlarged in the direction of the long dimension of the bottom member. Within each recess is a dove-tailed track 120 complementing the dove-tailed tracks 116 of the devices 114 and 115 so that the dove-tail tracks of the former may slidably interfit with the dove-tail tracks of the latter. This may be accomplished by superposing the bottom member 60' with respect to the floor fastened devices 114 and 115 so that the device 115 will be received in the elongated portion of the recess 119 and so that the dove-tailed track 120 of recess 118 will be seated upon the flat extension 117 of device 114. Now, with a slight bodily movement of the bottom member 60' of the grocery bag holder to the left in FIG. 8, the two sets of dove-tailed track elements will slidably interfit with one another thus acting to hold down or restrain the bottom member 60' and the remaining members of the holder against forces tending to lift the holder from the trunk floor. Of course, return bodily movement of the bottom member 60' will free the member from the floor hold-down device.

A third form of hold-down device for releasably securing the bottom member or mat to the floor of the luggage compartment of the motor vehicle is illustrated in FIGS. 9 and 10. In this variation, each pair of hold-down devices are similarly constructed and may be considered an elongated version of the device 106 illustrated in FIG. 7. In FIGS. 9 and 10 each hold-down device is generally indicated by the reference character 122. Except for the fastener means for securement of each device to the floor, each device 122 is a one-piece member which is long enough to extend for the full width of the bottom member or pad of the grocery bag holder and then a little more to enclose its adjacent corners. The one-piece member is jogged intermediate its ends to place its opposite marginal portions 124 and 125 at two different levels. The lower level portion 124 engages the floor of the luggage compartment and is the one which is fastened thereto. The upper level portion 125 is at a height above the floor approximating the thickness of the bottom member or pad and in use completely overlaps a narrow marginal strip at each end of the bottom member. It should be noted that the opposite ends of the one-piece members 122 are shaped with small walls 126—126 which prevent sidewise movement of the mat or bottom member of the holder assembly when the mat is inserted under the upper level portion 125 of the device 122 as shown in FIG. 9.

FIGS. 9 and 10 illustrate two different forms of floor engaging mats or pads. In FIG. 9 the mat 61 is slightly oversize the compartments formed by the pair of side wall panels 64—64 and crossing dividers 66 of the kind previously described herein. In FIG. 9, the provision on the mat 61 for containment of spillage is marked by the side wall panels and dividers. In FIG. 10 the spillage containment ridge 128 is molded with or otherwise secured to the upper surface of a wider mat 61' and extends unbrokenly around the mat. The ridge is shown truncated in cross section at least for the opposite end sections 130. Midway of each end section 130, the truncated shape of the ridge is modified to a square shaped rib 132 which is designed to snugly fit opposing slots in the side wall panels (See FIG. 30) and serve to frictionally secure the panels in their folded down position. The ridge 128 also carries one or more pairs of integrally molded slotted or open hinge parts 134—134 on corresponding opposite side portions of the ridge for receiving substantially cylindrically molded hinge pins 136 on the bottom edge of each side panel (FIG. 13). Each molded hinge part 134 is designed to cooperate with the hinge pin 136 to enable the panel 138 to fold down internally of the mat 61' so that the panel and the mat lie together in juxtaposed condition. Similarly, and therefor not shown, the opposite parallel panel 138 will likewise be folded down on the mat.

The "H" type divider or partition 66 is shown in FIG. 11 to be doubly divided into three equal sections by using living hinges at two places 140—140. Such a capability is utilized in FIG. 13 where the H-divider is folded partially upon itself to form three sides of a small size compartment of the grocery bag holder, the fourth side being formed by the expanse of the panel 138 between two adjacent vertical slots 90—90 therein into which the opposite ends of the H-divider are interlocked. FIG. 9 shows a further arrangement of the dividers; in this instance forming several different smaller size compartments for milk cartons, beverage bottles, etc. FIG. 12 illustrates the employment of a living hinge 142 for a horizontal axis about which the upper major portion of the side wall or panel 144 swings to folded position while the lower balance 146 thereof remains upright and functions as a spillage containment barrier or ridge. Moreover, the foldable panel section 144, living hinge section 142, the ridge section 146, and the mat 61' are all molded integrally together at one time so that they are permanently attached to one another even though certain of these parts are capable of movement relative to other parts.

The upper marginal portions 148 of the side walls or panels 64—64 and between the adjacent slots 90—90 have been thickened not only to increase their strength or stiffness but also to cause the panels to lie parallel to the bottom member or mat 66 when the two opposing panels are completely folded inwardly of the mat as shown in FIG. 4. These thickened borders 148—148 are preferably slightly undercut along their lower edges in order to be slidably or snap fittingly secured in such folded condition by at least one clip 150 which straddles the two adjacent border strips 148—148 and is complementarily shaped to enter and engage these undercut edges in the manner shown in FIG. 4. The result is that in non-use the embodiment of FIGS. 1-13 can be folded to a substantially flush condition with the floor of the automobile luggage compartment.

The embodiment of the invention illustrated in FIGS. 14-28 incorporated some of the features of the preceding embodiment but also embodies features of its own, such as the concept of not only collapsing the grocery bag holder to occupy a space considerably less than its operating condition but to displace the collapsed holder to a position leaving a large area of the original floor of the luggage compartment free to hold luggage or other bulky or weighty objects. In another respect, the present embodiment employs cross ribs in addition to dividers of the kind previously described which are lower level supports for the unhinged side wall or panel sections as well as acting as barriers to the spread of spillage beyond the confines of the compartment where it originated.

Referring more specifically to FIGS. 14-28, the upper area of the embodiment illustrated in these Figures is very much like the preceding embodiment and includes a pair of similarly shaped side walls or panels 152—152 which in operative position extend in upright spaced apart parallel relationship and maintained in such relation by the use of H-dividers which are identical in construction and function to the H-type dividers employed in the previously described embodiment. Because of their identical construction the parts of the dividers of the second embodiment are distinguished from corresponding parts of the first embodiment by the use of primed numbers. Accordingly, as shown in FIGS. 14-18, the dividers of the second embodiment are identified as 66'—66' and have their respective opposite ends shaped with the H-configuration 82' as illustrated in FIG. 5 for engagement in vertical slots 90' formed in the upper half sections of the two parallel panels 152—152 similarly as shown in FIGS. 3, 6, 30 and 34.

In the previously described embodiment the hinge pins or rods 68—68 for the side panels 64—64 were located close to the bottom pad 60 of the grocery bag holder assembly. In the presently disclosed embodiment the bottom pad 154 is integrally molded with short side and end walls 156 for the most part of the same thickness as its bottom member with the result it forms a shallow pan with an unbroken walled perimeter. Because of the thinness as well as the height of the pan's lower side walls, such walls when formed of molded plastic material are likely to be flexible and give way laterally outwardly from the pressure of filled and overloaded grocery bags. Restraining the side walls against possibly damaging displacement of this character are a plurality of transverse or crossing ribs molded integrally with the bottom member 154 and with the short side walls 156 so as to not only restrain the walls from undue bulging but also to serve as spillage containment elements. These crossing ribs are of two types, identified at 158 and 159, and in operating position of the assembly preferably lie in the same vertical plane as the dividers 66' so that the ribs bear against the lower sides of the filled grocery bags while at the same time the dividers 66' press against the upper areas of the filled bags and their contents. The open space between the high level dividers 66' and the low level ribs 158 and 159 enables the bulging middle area of the filled bags to intrude if necessary upon this space and enter an adjacent compartment.

Figure 14:
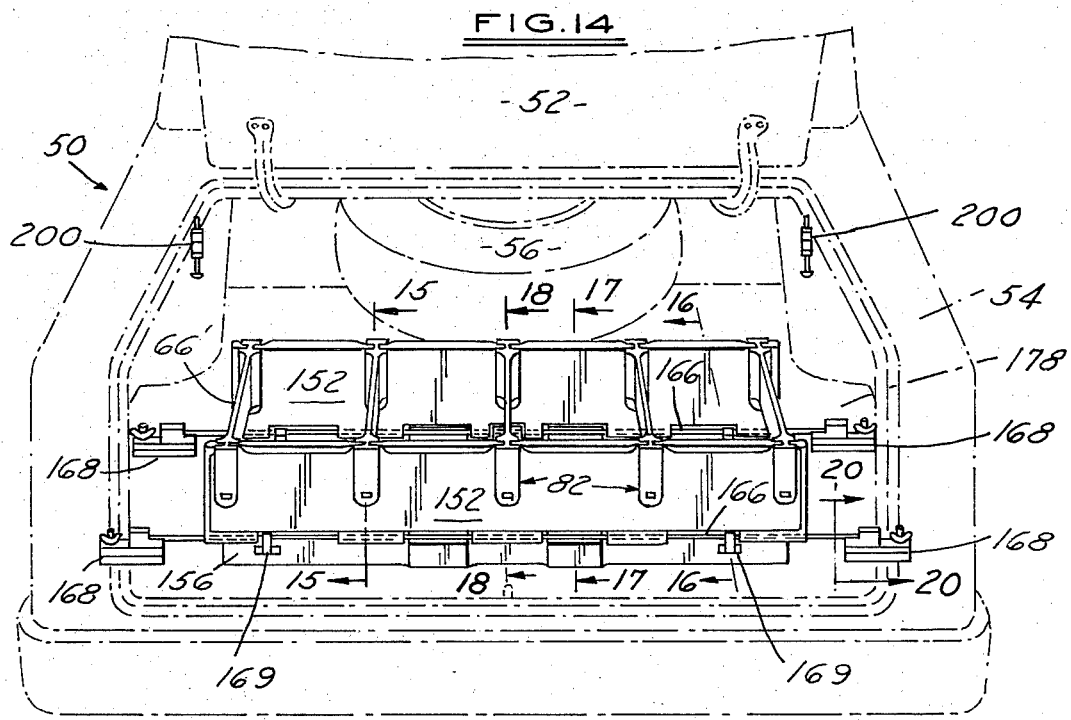
FIG. 14 is a view similar to FIG. 1 but showing another embodiment of the invention, sometimes referred to herein as the Tote-A-Bag holder, showing the same in operable condition to receive filled grocery bags.

The profile of the crossing ribs 158 under the second and fourth dividers 66' as counted from the left in FIG. 14 are alike and as shown in FIGS. 15-18 include a central protrusion 160 of general triangular shape which terminates in a flattened apex having a horizontal slot 162 therethrough for storage purposes. A pair of similarly shaped shorter protrusions 164—164 rise up from each rib 158 on opposite sides of the higher central projection 160 as shown in FIGS. 15-18 and also serve as storage elements as later described herein. The profile of the middle or third crossing rib 159 is shown in FIGS. 17 and 18. This rib underlies the middle divider 66' when the holder assembly is in operative condition and has two similarly shaped recesses 161—161 on opposite sides of its centerline thereby forming a short rise or tongue 163 which also serves as a storage element, and its function will be described later herein.

A hinge pin or rod 166 is physically associated with each side panel 152 and not only extends along the bottom edge for the length of its side panel but projects beyond each end thereof for connection to an anchoring device 168 for securing each end of the rod to the floor of the luggage compartment. Each pair of anchoring devices 168—168 will hold its respective hinge rod approximately one inch above the floor of the automobile trunk. As for the details of construction of the anchoring devices, reference will be made later herein to FIGS. 20 and 21. Suffice to say that for the time being each anchoring device has a provision for releasing its end of the hinge pin or rod 166 and thus permitting removal of either one or both of the hinge rods if desired.

Figure 15:
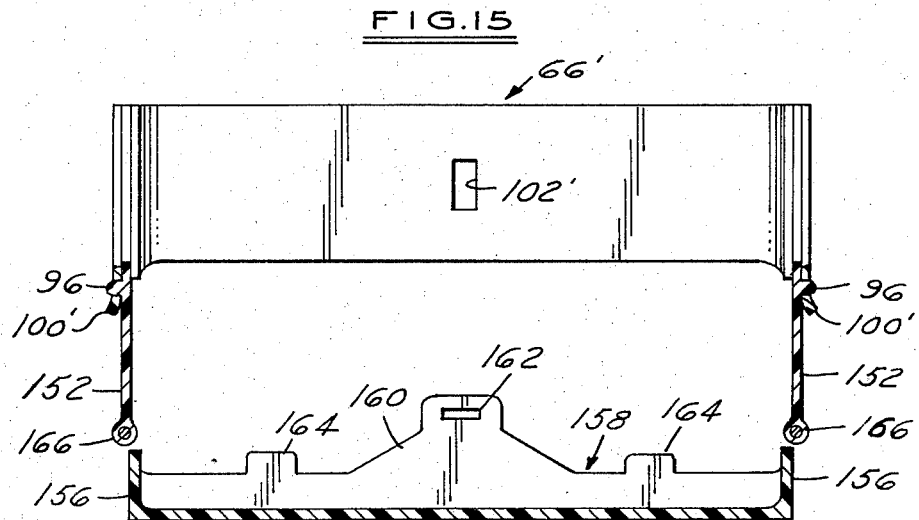
FIG. 15 is a vertical cross sectional view taken along line 15—15 of FIG. 14.

As for the remaining features of the second embodiment disclosed in the vertical cross sectional views of FIGS. 15 through 19 inclusive, the FIGS. 15 through 18 showing the opened condition of the grocery bag holder assembly and FIG. 19 the folded and collapsed condition thereof. In FIG. 15, the two hinge rods 166—166 lie in the plane of the side wall panels 152—152 but are shown just above and slightly outwardly offset to the longitudinally extending short side walls 156—156 of the bottom pan-shaped member 154. This offset relation holds true throughout the remainder of the sectional views represented in these Figures except for FIG. 17 to which special reference will be made later in this specification. It is to be further noted that at the section line of FIG. 15 the hinge rods 166—166 are enclosed within fully encircling hinges molded onto the lower margins of the side panels 152—152 of the grocery bag holder assembly.

Figure 16:
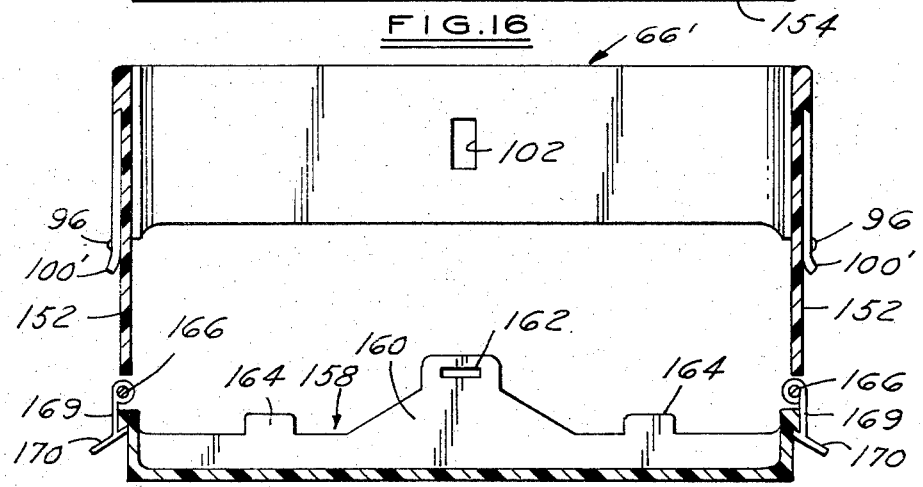
FIG. 16 is a vertical cross sectional view taken along line 16—16 of FIG. 14.

FIG. 16 is a vertical cross sectional view of the grocery bag holder taken on line 16—16 of FIG. 14 and showing one of two pairs of similar spring steel clips 169—169 which depend from the front and back hinge rods 166—166 and hook onto an undercut lateral protrusion molded on the upper edge of each side wall 156 of the bottom pan-shaped member 154. For this purpose the clip is provided with an angled handle 170 which also serves to enter the undercut area of the protrusion to form a releasable catch to hold the pan-shaped member to the side panels 152—152 of the holder assembly.

FIG. 17 is sectioned along line 17—17 of FIG. 14 to illustrate that for portions of their respective lengths the two hinge rods 166—166 are cradled in the upper edges of the side walls 156—156 of the pan-shaped bottom member 154. This further brings the upper assembly of foldable side panels 152—152 into connected relationship with the bottom pan assembly 154-158. To accomplish this result the longitudinally extending side walls 156 of the bottom pan 154 are thickened in two areas 172—172 on either side of the transverse centerline of the holder assembly and further are extended upwardly to meet and cradle the hinge rods 166—166 as shown by a comparison of this portion of FIG. 17 with FIG. 18. As shown, each hinge rod 166 is slightly oversized the slotted opening through which it is pressed to enter the partially encircling groove formed in the upper edge of each thickened wall 172. With the use of the clips 169 in FIG. 16 and the seating of sections of the hinge rods 166 in the grooves of the thickened walls 172, the upper and lower assemblies of the grocery bag holder are brought together and held from accidental separation.

FIG. 18 is a vertical sectional view taken along the transverse centerline of the grocery bag holder assembly and is generally like FIG. 17 except that the centerline support means cooperates with the collapsed folded condition of the holder assembly to first swing the collapsed unit through 90° and then support the unit in approximately vertical position immediately adjacent to the spare tire 56. This is accomplished by detaching the rearmost hinge rod 166 from its pair of anchoring devices 168—168 and utilizing a support leg 174 for taking part of the load of the collapsed unit. The support leg 174 for the holder assembly is shown pivotally attached to that hinge rod 166 which in the operative position of the parts of the assembly is the nearer of the two rods to the front end of the automobile. Although most of the parts of the grocery bag holder assembly carry out their respective functions when the assembly is unfolded and in upright condition, the support leg 174 to the contrary becomes functional only when the assembly is swung through an arc of about 90° from its collapsed horizontal position shown in FIG. 19 lying on the luggage compartment floor to the vertical position shown in FIGS. 26 and 27 adjacent to the spare tire 56. To accomplish this operation the collapsed folded holder assembly shown in FIG. 19 has its rearmost hinge rod 166 first detached from the rear set of anchoring devices 168—168 thereby freeing the assembly for bodily movement about the front hinge rod as an axis to the vertical position of the collapsed assembly shown in FIGS. 26 and 27. In this last position the leg 174 is brought under the folded assembly so that its bottom face 176 flatly engages the floor 178 of the luggage compartment as shown in FIG. 27 where it assumes its load supporting position.

As heretofore described FIG. 19 shows the grocery bag holder assembly in collapsed folded condition on the luggage compartment floor 178. To attain this condition, the dividers or partitions 66' are slidably removed from out of the slots 90' (FIG. 22) in the pair of side walls or panels 152—152 thereby freeing the panels for folding inwardly toward one another to the collapsed horizontal position shown in FIG. 19. However, before folding the side panels 152—152 in this manner, the removed dividers 66', which are five in number in this embodiment of the invention, are distributed about the bottom member 154 of the grocery bag holder in the manner illustrated in FIG. 22 and utilizing the protrusions on the crossing ribs 158 and 159 for entry into the central slots 102' of the dividers 66' for holding the same from lateral movements. More specifically, as earlier mentioned herein, the two crossing ribs 158—158 on opposite sides of the transverse centerline of the holder assembly each have two protrusions 164—164, of four such protrusions all together, upon which four of the five dividers 66' are individually mounted in the four corners of the shallow pan formed by the bottom 154 and its side and end walls 156. The single protrusions 163 of the central crossing rib 159 enters the slot 102' of the remaining divider 66' of the five to mount the same in the center of the bottom member 154 as shown in FIG. 22. The distribution of the dividers 66' in this manner enables them to be compactly housed within the height of the side and end walls 156 rising above the bottom member 154 and further enables the side panels 152—152 to be folded inwardly and downwardly upon the stowed dividers 66' in the manner shown in FIG. 19.

Although one or more securing clips like 150 of the first described embodiment might be used to hold down the side panels 152—152 in the manner illustrated in FIG. 4, an alternative way is to use a flexible bar 180, such as shown in FIG. 28, having similarly reduced opposite end sections 182—182 for entry into the slots 162—162 of the two crossing ribs 158—158 correspondingly located on opposite sides of the transverse centerline of the grocery bar holder assembly. These two ribs 158—158 underlie the second and fourth dividers 66'—66' (counting from either end in FIG. 14) when the holder assembly is in upright operative condition for receiving grocery bags. Preferably, the bar 180 is so dimensionally related to the distance separating the two slots 162—162 from one another as to be held in slightly flexed condition out of its normal flat plane when its reduced ends 182—182 are fully received in the slots and its shoulders are resiliently pressed against marginal portions of the ribs surrounding the slots. The resulting slight bow to the bar 180, whether in full or dash lines in FIG. 28, is intended to show not only the capability of the bar to be deflected to one or the other condition without stopping at its normal flat plane condition but also to exert an endwise pressure tending to close down the pair of side panels 152—152 upon the five dividers 66' housed within the pan-shaped bottom member 154-156. To keep the dividers from individually rattling, it is preferred to have the mounting arrangement for each divider create a slight bow therein, such as shown in FIG. 23. This is accomplished by establishing pressure points at spaced intervals along each divider, one in the center of the divider and one each at its opposite ends. As shown in FIG. 23, the H-configurations 82—82 at the opposite ends of each divider are contactually sandwiched between the bottom member 154 and the inwardly folded side panels 152—152. By making the height of the upper edge of each crossing rib 158 and 159 slightly higher than half the width of the H-configurations 82'—82', it is possible to impart a slight upward bow to each divider 66' in the manner illustrated in FIG. 23 and prevent any rattling movements thereof while stowed away in the collapsed folded unit illustrated in FIGS. 19, 26 and 27.

FIGS. 20 and 21 illustrate the construction of one of the four anchoring devices 168 previously briefly mentioned herein. Each such device comprises a base member 184 secured by screws 186 or the like to the floor 178 of the luggage compartment and provided on its exposed surface with an upwardly opening dovetailed track 188 extending parallel with the hinge pin or rod 166 associated with either one of the two side panels 152. Superimposing the base member 184 is a rod supporting member 190 having the bottom side thereof complementarily engaging the dovetailed track 188 for slidable movement therealong but normally held in the adjusted position shown in FIG. 21 by a stationary wing nut assembly 192. In this position the adjacent end of the hinge rod 166 is slidably fitted in a bore 194. However, with the wing nut loosened, the rod supporting member 190 may be bodily moved along the track to the right in FIG. 21 sufficiently far enough to clear the end of the hinge rod 166 thereby freeing this end of the rod from the anchoring device. To hold each side panel in place on the hinge rod, a collar 196 slidable on each end section of the hinge rod 166 is provided which is lockable in adjusted position by means of a set screw 198.

When the collapsed folded holder assembly is tilted forwardly toward the spare tire 56 to assume the vertical position shown in FIG. 27, the outer ends of the hinge rod 166 carried on the now freed end of the collapsed folded unit of FIG. 19 is brought up into engagement with two gripping devices generally indicated at 200—200 for releasably holding the folded unit in the vertical position shown in FIGS. 26 and 27. The gripping devices 200—200 are located in the upper right and left hand corners of the luggage compartment as viewed in FIG. 14, and advantage is taken of the drain troughs in which the trunk lid is received for suspending the two gripping devices in the manner shown in detail in FIGS. 24 and 27. Each herein illustrated gripping device 200 comprises a fully threaded bolt 202 which is suspended from a lip 204 of the drain trough 206 in which the trunk lid is received when closed. Mounted on the bolt 202 is a traveling frame 208 carrying two gripping jaws 210—212, the first of which is fixed to the traveling frame and the second of which is pivoted to the first jaw and spring loaded to closed condition therewith. In FIG. 24 the jaws 208 and 210 of the illustrated embodiment are shown in gripping engagement with the rearmost hinge rod 166 of the tilted folded unit, it being evident that the spring loaded jaw 212 is formed with a release tab 214 for quick opening of the jaws. Height adjustment nuts 216—216 threaded on the bolt 202 provide vertical adjustment of the traveling frame 208. A pair of nuts 218—218 on the upper end of the bolt 202 cooperatively engage the lip 204 therebetween and lock the bolt in vertical suspension thereto. As shown in FIG. 27, the weatherstripping 220 overlies the uppermost nut 218 to conceal it from view as well as to serve its primary function.

In lieu of the four anchoring devices 168 shown in FIGS. 14, 20 and 21 for holding down the ends of the hinge rods 166, gripping devices of the character just described in connection with FIG. 24 may be substituted therefor. In the manner shown in FIG. 25, a pair of gripping devices 222—222 are welded or otherwise mounted within an upwardly opening channel-shaped member 224 which in secured condition on the floor of the luggage compartment of the automobile will extend in a fore and aft direction of the vehicle and will locate the gripping devices in the same locations on the right and left hand sides of the luggage compartment as the four anchoring devices 168 shown in FIG. 14. That is to say, each pair of substitute gripping devices 222—222 of FIG. 25 is located on the right and left sides of the upright operative grocery bag holder assembly illustrated in FIG. 14 and secured by means of its channel member 224 to the floor of the compartment so that each pair of such gripping devices 222 assumes a position corresponding to that previously occupied by the pair of anchoring devices 168—168 on either side of the holder assembly. It is evident that the gripping devices 222 are constructed the same as the previously described gripping devices 200 except that the former are mounted as pairs on a channel-shaped member 224 common to each pair whereas the latter are individually mounted on vertically extending bolts 202. For securement to the floor of the luggage compartment, each channel member 224 is provided with holes through the base of its channel shape, one of which is identified at 226, for receiving screws or other fastening means for this purpose.

Another feature of this second embodiment enables the pan 154 to be removed singularly or by itself for cleaning, while leaving the side members 152—152, dividers 66' and rods 166—166 of the assembly intact. This is accomplished by relasing the four clips 169 from the undercut protrusions on the short side walls 156 of the pan and by releasing the ends of the back rod 166 from the back pair of anchoring devices 168—168 and also from the rear cradles 172 on the pan. The assembly is then tilted upward and secured into the jaws of the gripping devices 200—200 suspended from the trunk lid drain trough. With the assembly in this vertical on-edge position, the lower end of the pane is tilted slightly upward, releasing the forwardly cradled rod 166 thereby completely freeing the pan for removal and subsequent re-installation.

It is also apparent that when the collapsed components of the grocery bag holder assembly is swung from the initial folded position on the floor of the luggage compartment as shown in FIG. 19 to the forward on-edge vertical position illustrated in FIGS. 26 and 27 it provides almost as much room in the compartment rearwardly of the tire 56 as when the holder equipment is entirely removed from the vehicle. The releasable locking mechanism for holding the collapsed assembly in upright vertical position assures a sturdy mount for overcoming road bumps and jolts encountered in normal travel of the vehicle. Moreover, the unobstructed space behind the collapsed assembly is available for storing luggage, tools, etc., while at the same time the equipment is at hand in the trunk compartment for holding filled grocery bags and similarly shaped objects in upright condition.

FIGS. 30-33 illustrate a thrd embodiment of the invention wherein pivot mounts at the four corners of the bottom member essentially serve as the means for providing swinging movement of the side walls or panels 230—230 from upright parallel position with one another to collapsed folded position being closely parallel to the bottom member or mat 232. Preferably, as indicated by the cross sectioning, large areas of this embodiment are made of molded plastic material. However, several important members of this assembly are preferably made of metal including a channel-shaped member 234 for each end of the assembly, one of which is shown in FIG. 30. Each channel member has a tall side wall 236, a short side wall 238 and a base member 240 which connects the two side walls of the channel and which is fastened to the floor of the luggage compartment by screws 242 or the like. At each end of the channel member 234 the short side wall 234 is increased in height as indicated at 238' to almost that of the tall side wall of the channel and the two opposed sections cooperate to form a pivotal mount by means of a bolt 244 which provides the axis about which a split sleeve member 246 is pivoted. A similar split sleeve member 246 of the character illustrated in FIGS. 30 and 31 is applied to the remaining ends of the two channel members 234—234, one of which only is shown in FIG. 30, it being understood that a similarly shaped channel member 234 is provided at the opposite end of the holder assembly.

Each split sleeve member 246 is associated individually with an end of one of the two foldable panel members 230—230 and such that the respective ends of the panels slidably fit the split sleeves 246 so that the panels may be readily withdrawn completely from the sleeves and subsequently slidably re-introduced thereinto. For restraining the panels 230 to a given line of movement the interior of each split sleeve member 246 is generally triangularly shaped in cross section and the end of the panel engaged by the sleeve is complementarily shaped for a sliding fit therein as indicated by the reference character 248. The two split sleeve members 246 on the opposite ends of each panel serve as frame members for removably attaching each panel to the assembly. The split sleeve members 246 in fully folded condition also align their respective panels in the same plane where the panels mutually block one another from detachment from their sleeve members. The short side wall 238 of each channel member 234 cooperates in this alignment procedure by serving as a stop limiting further pivotal movement of the two panels as indicated in the break away area of the channel member shown in FIG. 30.

The panels 230—230 are shown with slots 90" and protruding lips 96" for receiving and detachably securing the H-type dividers 66 with release tabs 100 described in connection with the first embodiment of the invention. In FIG. 30, the upright panel 230 illustrates in dot-dash outline the engagement of one end 82 of such a divider 66 with the slot 96" and its associated lip 96". In the same Figure the opposing side wall panel 230 is shown folded down in close parallel proximity to the mat 232. Continued use of the slots 90" in the fully folded condition of the panel is shown in FIG. 30. Spillage containment ridges 250 are preferably integrally molded onto the mat 232 adjacent to the opposite ends thereof and in line with the endmost slots 90" in the panels. These containment ridges 250 are made as wide as the slots 90" and elevated for that portion 252 of their length aligned with the slots so as to enter the same as shown by the folded down panel on the right hand side of FIG. 30. The result is that the elevated portion 252 of the containment ridges will frictionally engage the side walls of the slots 90" and resistingly retain the panels in folded down condition exhibited by the panel 230 on the right side of FIG. 30.

The bottom edge of each panel 230 may be molded with a cylindrical enlargment 254 extending for substantially the length of the panel. This enlarged rounded edge 254 will abut an integrally molded upstanding flange 256 on the longitudinal edges of the mat 232. At spaced intervals it is desirable to mold or otherwise secure several lateral extensions to the longitudinal edges of the mat 232 which are shown at 258 in the upper portion of FIG. 30 and in the enlarged detail view of FIG. 32. Each such lateral extension 258 has an inwardly facing arcuate surface 260 having a radius of curvature corresponding to that of the cylindrically shaped lower edge 254 of each panel 230 and such that the panel has a permitted 90° swing from its upstanding position shown in full lines in FIG. 32 to its inwardly folded position shown in dashed outline in the same Figure.

FIG. 33 illustrates a modification of the manner of shaping and mounting the two side panels 230—230. Instead of terminating the lower edge of each side panel 230 by a cylindrically-shaped margin such as shown at 254 in FIGS. 30 and 31, the lower edge of each modified panel 230' in FIG. 33 is extended to engage the floor 178 in the absence of the bottom member 232. It is also widened approximately three times the thickness of the panel as shown at 262 to provide a large surface area for engagement with the floor sufficient to render each panel 230' to be self-supporting in upright position. It is understood that the opposite side panel 230' is similarly shaped and mounted for floor engagement and support. It is also understood that connecting dividers would extend across the space between the opposing panels and intergage therewith in the manner described herein in order to assist in supporting the modified panels 230' in floor engaging upright parallely related positions.

In the embodiments of the invention previously described herein, the side panels 64—64 and 230—230 and modifications thereof have all been of a dimension to extend the full length of the grocery bag holder assembly. In the embodiment of the invention illustrated in FIGS. 34-38, the side panels are of varying shoter lengths and provide openings therebetween of a size to admit the human hand to help in loading filled grocery bags into the holder assembly and for unloading the same. As shown in FIG. 34, the left set of opposing pair of panels 264—264 are held in upright position by a divider 66 having its ends 82 removably slidably received in panel slots 90 as previously described herein and separated by spacer elements 265—265 and 267—267 from the next set of panels 266—266. One of latter is shown folded down into close relation with the bottom member or tray 268 which is preferably made of molded plastic material.

When molded, the tray 268 is shaped with spillage containment ridges including a pair of longitudinally extending ridges 270—270 which underlie the two rows of side panels 264—264 and 266—266, itc., and terminate at the opposite transverse ridges 272 of rectangular cross-section, one of which is shown in the left portion of FIG. 34. Paralleling each longitudinal ridge 270 in close proximity thereto is a pivot rod 274 about which the side panels are individually foldable in the manner illustrated in FIG. 35. Each longitudinal ridge extends unbroken for its length and is shaped with a shallow channel surface portion 276 which has a radius of curvature corresponding substantially to that of the rod 274 with which the ridge is associated. It is apparent from FIG. 35 that the height of the inner side wall of each shallow channel 276 is shorter than its outside wall and that the difference enables each panel to swing 90° from its upright position to its folded position substantially paralleling the tray 268. It is also apparant that for the embodiment illustrated in FIG. 34 where the lower ends of the panels 264—264 and 266—266 completely encircle the pivot rods 274—274 that a slidable fit be provided between the pivot rods 274—274 and the bores of the side panels and spacer members through which the rods extend.

The pivot rods 274—274 are shown in FIG. 34 as extending beyond the opposite terminals of the spillage containment ridges 270—270 and through the transverse containment ridge 272 and therebeyond where a collar 278 and set screw 280 lock the rods against longitudinal movement relation to the balance of the parts making up the holder assembly. In lieu of the locking collar 278, clamping devices of the character of 200 and 222 (FIGS. 24 and 25) may be employed to releasably hold the pivot rods in operating position.

FIGS. 36-38 illustrate modifications of certain elements making up this embodiment of the invention. For example, FIG. 36 shows a modification of the lower edges of the panels 264-266 etc., where instead of a sleeve completely surrounding the pivot rod as in FIG. 34 the sleeve is slit or molded as in FIG. 36 to form a slot 282 opening into the bore 284 of each panel for the length thereof which is slightly less in width than the diameter of the pivot rod but which is resiliently expandible to admit the pivot rod when the panel is vertically pressed into engagement therewith. This form of attachment is sometimes referred to as "snap fitting engagement". Similarly, as shown in FIG. 37, the spacer elements 265, 267, etc., may be constructed with like expandible slots 286 for lateral snap fitting engagement of the spacer elements to the pivot rods. The attachment of the panels to the pivot rod may be modified as shown in FIG. 38 where the resiliently expandable slot 288 opens into the side of the bore thereby requiring lateral pressure rather than vertical pressure to attach each panel to its associated pivot rod. It is evident that the modifications illustrated in FIGS. 36-38 enable the panels and the intervening spacer elements fo be fitted onto the pivot rods without the necessity of stringing them on the pivot rods in sequential order from one or the other end thereof. Instead, they may be conveniently snap fittingly engaged with each pivot rod at their respective locations along the length of the rod. Accordingly, it may be further noted that one or more compartments of varying sizes may be formed or erected as desired.

It is apparent from the discussion of this embodiment that the spacer elements may be of assorted lengths in order to provide spaces of corresponding width and unlimited height thereabove into which the hands may be introduced to aid in loading filled grocery bags into the upright holder assembly and the removal of such bags therefrom. Usually, the sizes of the compartments for receiving the filled grocery bags are pre-arranged in accordance with the standard bag sizes furnished by the shopping center patronized by the possesor of this embodiment. A commonly used bag width in the longitudinal direction of the holder assembly is 8 10/16 inches as measured between adjacent dividers 66 or their respective slots 90 in the panels. To accomodate this width of bag using identically shaped slotted panels requires a spacer element providing 4 5/16 inch separation of the two identical panels. Such panels would have their divider receiving slots 90 located midway of their respective widths of 2 5/32 inches from the nearest end of the spacer element used to separate the two panels. The result is that the width of the space for receiving the hand is twice the width of the effective portions of the panels utilized to create the bag receiving compartment because only half of the width of the two panels are used for making this compartment, the remaining half-portion of each panel being used for making the next adjacent compartment or not used at all as represented by the leftmost set of panels 264—264 in FIG. 34.

The embodiment of the invention illustrated in FIGS. 39 to 43 is based on similar subject matter described in applicant's aforesaid application for U.S. patent Ser. No. 721,823, filed Sept. 9, 1976. Shown in applicant's prior application as well as herein is a grocery bag holder generally indicated at 300 in which the grocery bag compartments are arranged in a cluster aroung a common center 302 formed by a pair of criss-crossing dividers or partitions 304 and 306, the dividers extending at right angles to one another and each interfittingly slotted halfway with the other along the line of intersection at the center 302. The opposite ends of each divider is similar formed with a "T"-shaped terminal which is slidably received in a "T"-shaped pocket formed in a thickened portion 308 of an individual one of the wall panels forming the outer face of the grocery bag holder. In the illustrated embodiment there are four outer walls of which two are longer parallel side walls 310 and 312 and two are shorter parallel end walls 314 and 316. The dividers 304 and 306 occupy approximately the upper half of the walled enclosure across which they extend, and by virtue of their connections to the side and end walls the dividers help hold the walls in upright or vertical position. They also serve to hold a filled grocery bag within the compartment in which it was installed.

The wall panels 310, 312, 314 and 316 are hinged near their respective lower edges for swinging movement inwardly of the structure when the dividers are removed. Preferably the hinge for each wall panel is of the type illustrated in FIG. 12 herein where it is formed by a local thinning 318 of the wall structure which extends the full length of the wall and forms a horizontal axis about which all of the wall panel above the hinge line can fold inwardly upon itself as shown by the wall panels 310 and 312 in FIG. 40. In order to avoid conflict with one another when they are folded, the hinge axes for the two side wall panels 310 and 312 are placed slightly higher than the hinge axes for the two end wall panels 314 and 316 as exhibited in FIG. 41. Two of the side wall panels 310 and 312 carry similar end flaps or flanges 320 and 322 respectively which fold around the corner to overlap upon the end wall panels 314 and 316. Each end flap is provided with a vertical slot 324 into which is received an integrally molded projection or ridge 326 on the end wall panel which is overlapped by the flap as shown in FIG. 42. All of the sections 328 of the wall panels 310, 312, 314 and 316 below the hinge line 318 remain erect even though the upper portions of the panels are folded down as shown in FIG. 40. Remaining in vertical positions, these lower panel sections 328 are integrally joined to and cooperate with the bottom member 330 to form a pan underlying the structure of the grocery bag holder and providing spillage retention.

The bottom member 330 of the embodiment involving FIGS. 39 to 42 is preferably secured to the floor of the automobile trunk compartment through means which includes one or more magnetic field producing devices for removably retaining the grocery bag holding structure in one place. For such purpose, two similar metallic strips 332-332 are secured by screws or the like to the floor of the luggage compartment in spaced apart parallel relation extending in the direction of the long dimension of the grocery bag holder and transverse to the longitudinal dimension of the vehicle. Specifically each strip exhibits a hat shape in cross section as shown in FIGS. 39 and 40 and extends for the length of the grocery bag holder and for a distance therebeyond to accomodate variable positioning of the holder on the strips. The underside of the grocery bag holder is provided with means which straddles the hat-shape formation of the strips and thus prevents sidewise movement of the holder and which also through the medium of magnetic attraction restrains movement of the holder in the direction of the strips. The straddling provision is accomplished by associating a pair of parallel ribs 334-334 with each hat-shaped strip so that the central rise on each strip is gripped therebetween in the manner shown in FIG. 40. The mangnetic device is a body of magnetized material 336 sandwitched between the central rise of the hat-shaped strips and the underside of the bottom member 330 of the grocery bag holder as shown in FIG. 40. Adjacent FIG. 41 shows in perspective the shape of the elements making up strip gripping and magnetic attraction provisions of this embodiment of the invention.

The embodiment of the invention illustrated in FIGS. 43 to 47 combines certain features herein before disclosed with a permanently shaped container of rectangular configuration for holding filled grocery bags which is installable and removable as a unit onto and off the floor of the automobile luggage compartment. The illustrated container, which is generally indicated at 340, is preferably molded in one piece out of plastic material and comprises a pair of opposed parallel side walls 342-342 integrally joined at their corners with a pair of opposed parallel end walls 344-344 of shorter length. The upper end of the container is preferably retained in opened condition; the lower end is preferably closed by a bottom member or pad 346 which is integrally joined to the lower edges of the side and end walls of the container.

In operating condition, the upper region of the container is preferably occupied by a plurality of dividers or partitions which, as shown in earlier embodiments of the invention herein, usually extend transversely across the container from one side wall to the other side wall. Such dividers may take the form 66 illustrated in FIG. 5 and provided with "H" configurations 82—82 at opposite ends thereof for slidable interfit with vertical slots 90 molded or otherwise formed in the side walls 342—342 of the container. Instead of "H" configurations for interlock with the side walls, "T" connections of the character disclosed in FIG. 39 may be used for slidable fit with a "T"-shaped pocket formed in the side wall of the container. The dividers may have one or more living hinges 140 formed therein as shown in FIGS. 11-13 herein for bending the divider partially upon itself to form a smaller compartment in the container 340. One such divider 66 is illustrated in FIG. 43 having a single living hinge 140 therein which is folded to form a smaller corner pocket in the container 340. To accomplish this, a vertical slot 90 is formed in each of the end walls 344 of the container. Other features associated with the herein illustrated dividers may be incorporated into this embodiment of the invention, including the interlock protrusion 96 below each vertical slot 90 and the interlock slot 92 for receiving the protrusion and interlocking therewith. Another borrowed feature is the provision of molded flanges 348 along the top edges of the side and end walls of the container 340 which project outwardly laterally thereof and increase the rigidity of the wall sections of the container. These flanges 348 are similar to the thickened borders 148 shown along the upper edges of the side wall panels as shown in FIGS. 1, 3, 16, and 17 and both features have the common function of stiffening the wall sections of their respective embodiments. It should be noted that to avoid interference with the dividers 66 received in the wall slots 90, the flanges are recessed back from the slots as indicated at 349 in FIGS. 43 and 44 in order to receive the outer wings 84—84 of the H-type divider 66 shown in FIG. 5 herein.

The body of the container 340 is jogged on all four sides on the same level approximately midway of its height as shown at 350 not only to provide nesting of the containers one within the other when not in use, but also to cooperate with the flanges 348 in increasing the rigidity of the wall sections. It is apparent that the extent of the jog 350 is the thickness of the wall sections and in the direction to make the upper half of the container that much wider in all four directions than the lower half of the container. Also, the underside of the container is provided with an integrally connected center rib or leg 352 running the length of the container and further provided with a pair of similarly shaped legs or ribs 354—354 which are co-planar with and integral extensions of the lower half of the side walls of the container but terminate short of the ends of the side walls, as evident in FIGS. 43 and 44. All three legs 352 and 354—354 depend the same distance from the underside of the container's body and serve as supports therefor when the container is out of the luggage compartment of the motor vehicle.

When operatively installed within the luggage compartment, the presently described embodiment is preferably supported by four anchoring corner blocks which are secured to the floor of the compartment and enable the container 340 to be easily mounted on such blocks and to be easily removed therefrom. To this end, each underside corner portion of the container is provided with an integrally connected depending dovetail section 356 which runs lengthwise of the container body and has a vertical dependency less than the supporting legs 352 and 354—354 of the container as evident in FIG. 44. Cooperating with each dovetail section 356 of the container is a floor-anchored block 358 which is complementarily angled for slidable engagement with the angled sides of the dovetail sections 356 of the container. The angularity of these engaging sides in such that once engaged the floor-anchored blocks 358 act to hold down the container to the floor 360 of the trunk or luggage compartment while permitting one directional slidable movement parallel to the floor. Following full insertion of the dovetail sections 356 into the anchor blocks 358, a stop member, such as shown at 362 in FIG. 46, is set across the dovetail track of two of the anchor blocks in position to block return movement of the container.

More specifically, the pair of anchoring blocks stationed at one end of the container differ from the remaining two such blocks stationed at the other end of the container. Referring to the exploded view of the parts illustrated in FIG. 43, the two anchored blocks 358—358 at the left end of the Figure have removable stop members 362—362 whereas each of the two such blocks 364—364 at the right end of FIG. 43 (only one being shown) has a permanently fixed stop member 366 astride the dovetail track. Otherwise, the two sets of anchored blocks have the same structure and function. When the empty container 340 is placed in the luggage compartment preparatory to the purchase of grocery items and the like, the removable stop members 362—362 are finger lifted off of their respective anchor blocks and the container is then bodily moved to a position slightly to the left of that shown in the exploded view of FIG. 43. Thereafter, the container body is maneuvered to introduce its dovetail sections 356 into the dovetail tracks of the two sets of anchor blocks 358 and 364 and pressed toward the right until the container strikes the fixed stop members 366 on such blocks. Following this action, removed stop members 362—362 are replaced on the anchor blocks at the left end of FIG. 43 to prevent return movement of the container. The replacement of the removable stop members is accomplished by the simple expediency of employing two cylindrical plugs 368—368 projecting from each stop member 362 and concurrently slidably fitting two circular holes 370—370 drilled or otherwise formed in the anchor blocks 358—358. In this manner the container is locked against movement in any direction except vertically.

The anchor blocks 358—358 and 364—364 underlying the corners of the container 340 are preferably separately secured to the floor 360 of the luggage compartment by three metal screws. Two such screws 374—374 are deeply seated one within each hole 370—370 which also receive the cylindrical plugs 368—368 of the removable stop members 362—362. Referring to FIG. 44 and particularly to the two holes 370—370 drilled or otherwise formed in the anchor blocks 358—358, it is apparent that the screws 374—374 are located in the bottom portion of their respective holes while the plugs 368—368 of the stop members are receivable in the upper portion of the same two holes to cause the stop members to perform their locking function. The third metal screw 376 for each anchor block assembly is provided with a counter sunk hole 372 located centrally in the dovetail track of each anchor block and relatively remote from the pair of holes 370—370. The two metal screws 374—374 are introduced into their respective holes in the absence of the removable stop member and screwed into the metal floor of the luggage compartment; the third screw 376 is similarly accessible to its hole 372 in the absence of the complementing dovetail section 356 of the container.

Although the grocery bag holders of the present invention may be made out of paperboard, fibreboard, wood, wire mesh, rods and rubberized material, it is preferred to use molded plastic material to form the panels, dividers and base members of the holders.

While particular embodiments of the invention have been shown and described, it will be understood, of course, that it is not desired that the invention be limited thereto since modifications may be made, and it is therefore contemplated by the appended claims to cover any such modifications as fall within the true spirit and scope of the invention.

What is claimed is:

1. A collapsible grocery bag holder for installation in an automobile luggage compartment comprising, in combination:

a rectangular, generally flat and flexible base member in the form of a floor mat, said floor mat having an elevated ridge, extending completely around and unbroken within the perimeter of said floor mat, for the containment of spillage ocuring therein, said containment ridge being at least equal in height and in width respectively, as the thickness of the said floor mat;

a pair of parallel and longitudinally extending side wall members spaced apart a distance approximately equal to the combined width of said side wall members, and wherein the opposed said side wall members are pivotally attached to said floor mat by means of living hinges, said living hinges, being located between the top of the longitudinal extending sections of the said containment ridge and the bottom of said side wall members, said side wall members thereby being foldable over said floor mat into a generally flat unit, and wherein said side wall members are provided with a series of open ended correspondingly positioned slots, said slots extending upwardly from approximately midway of said side wall members and through the top edges thereof;

a plurality of dividers of relatively rigid material and similarly shaped, for slidable fit by a downward movement into said correspondingly positioned slots provided on said side wall members, said dividers transversely bridging the respective side wall members, forming compartments for the reception therein of filled bags of groceries; and having the opposite ends of each such divider exhibiting in cross section an "H" shaped configuration, formed of two opposed pairs of winged-like sections spaced apart at least the thickness of said side wall members by a centrally located membrane, said membrane approximating dimensionally in length and in width, as the said slots, for slidable fit therein, for supporting said dividers in a suspended position extending no lower than approximately half the depth of said side wall members, leaving the lower portion of said collapsible grocery bag holder unobstructed for accommodating overly stuffed bags of groceries; and wherein the opposed said winged sections straddlingly engage, in the immediate area of said slots, their respective said side wall members, thereby preventing lateral movement thereof, and securing said side wall members in an upright, vertical operative position.

2. The collapsible grocery bag holder as defined in claim 1 wherein each said side wall member is provided on its outer wall, with a series of protrusions, each in the immediate area of the lower terminating end ofthe said slots, and wherein the outer winged section, at the longitudinal extremities of the said dividers extend lower than the inner winged section and related membrane, said extended portion being provided with an aperture, and wherein the inner lower wall of said extension is tapered downward and outwardly; thus as the divider is inserted and nears its downward limit, the tapered end of said extension pressure slips over the said protrusion, and allows the said aperture to automatically snap-fittingly engage the same, locking the said dividers in their operative positions and preventing accidental lift-off thereof, as the grocery bags are removed.

3. The collapsible grocery bag holder as defined in claim 1 wherein at least one or more of the said dividers are each provided with two living hinges, having axes extending parallel to one another and transversely to the longitudinal dimension of such dividers, said living hinges being spaced apart approximately one third the dimensional length of sid divider, and said at least one or more of said dividers are thereby foldable into a "U" shape, and wherein the ends thereof are insertable into said corresponding slots on either one of the two said side wall members, forming comparatively smaller compartments, for supporting such items as milk cartons, beverage bottles and the like.

4. The collapsible grocery bag holder as defined in claim 1 wherein the two sections of the said containment ridge which transverse and intersect the two longitudinally extending sections thereof, are each provided with a superimposed elevation, extending longitudinally thereon approximately centrally of the dimensional length of said transverse ridge section and approximating in height and width the thickness of the said side wall members and the width of the said slots respectively, and wherein said transverse ridge section and said elevation thereon are aligned with the related said slots on the two said side wall members, for frictionally engaging approximately half of the open-ended portion of said slots, thereby detachably securing the opposed said side wall members in a folded down nonoperative position, thus preventing flapping or rattling thereof while the vehicle is in motion.

5. The collapsible grocery bag holder as defined in claim 2 wherein two similarly shaped one-piece devices are provided for releasably securing said collapsible grocery bag holder in a fixed position within the automobile luggage compartment, each said device having upper and lower flanges, offset intermediately by a vertical web, said web approximating in height the thickness of said floor mat for slidably fit under each said device, and wherein the opposite ends of said upper flange are shaped with small walls forming an enclosure approximating in length, the width of said floor mat, and wherein each said device is fastened, with the said upper flanges inwardly directed toward and opposed to one another, to the floor of the luggage compartment with bolts or metal screws, through two or more apertures provided on said lower flange, said devices being spaced apart a distance approximating the length of said floor mat, measured between said vertical webs, thus with said devices so secured, one end of the said floor mat is slid into its related said device, the opposite end is curled upon its self, clearing its related device and then released thereunder, thus employing the flexibility of said floor mat to facilitate installation and removal of said collapsible grocery bag holder from the automobile luggage compartment.

6. A collapsible grocery bag holder for installation in an automobile luggage compatment comprising, in combination:
   a rectangular, generally flat and flexible base member in the form of a floor mat, said floor mat having an elevated ridge, extending completely around and unbroken within the perimeter of said floor mat, for the containment of spillage occurring therein, said containment ridge being at least equal in height and in width, respectively, as the thickness of the said floor mat;
   a pair of parallel and longitudinally extending side wall members spaced apart a distance approximately equal to the combined width of said side wall members, and wherein the opposed side wall members are pivotally attached to said floor mat by hinge rods enclosed by an alternate series of hinge sections attached to the bottom of each said side wall member and hinge sections attached to said floor mat, said hinge sections which are attached to said floor mat are aligned and located within said containment ridge and close to the longitudinal sections of said containment ridge, said side wall members thereby being foldable over said floor mat into a generally flat unit, and wherein said side wall members are provided with a series of open ended correspondingly positioned slots, said slots extending upwardly from approximately midway of said side wall members and through the top edges thereof;
   a plurality of dividers of relatively rigid material and similarly shaped, for slidable fit by a downward movement into said correspondingly positioned slots provided on said side wall members, said dividers transversely bridging the respective side wall members, forming compartments for the reception therein of filled bags of groceries; and having the opposite ends of each such divider exhibiting in cross section an "H" shaped configuration, formed of two opposed pairs of winged-like sections spaced apart at least the thickness of said side wall members by a centrally located membrane, said membrane approximating dimensionally in length and in width, as the said slots, for slidable fit therein, for supporting said dividers in a suspended position extending no lower than approximately half the depth of said side wall members, leaving the lower portion of said collapsible grocery bag holder unobstructed for accommodating overly stuffed bags of groceries; and wherein the opposed said winged sections straddingly engage, in the immediate area of said slots, their respective said side wall members in an upright, vertical operative position;
   and wherein one of said side wall members is releasable from said floor mat by the withdrawal of its associated hinge rod thereby allowing both of said side wall members with said dividers in place, as an assembled unit, to be pivoted upwardly on the other hinge rod associated with the other of said side wall members to an upright position and exposing said floor mat and readily leaving a major portion of the luggage compartment unobstructed.

7. A collapsible grocery bag holder for installation in an automobile luggage compartment comprising, in combination:

- a rectangular, generally flat and flexible base member in the form of a floor mat, said floor mat having an elevated ridge, extending completely around and unbroken within the perimeter of said floor mat, for the containment of spillage occurring therein, said containment ridge being at least equal in height and in width, respectively, as the thickness of the said floor mat;
- a pair of parallel and longitudinal extending side wall members spaced apart a distance approximately equal to the combined width of said side wall members, and wherein the bottom of each said side wall members is substantially cylindrically shaped for snap-fitting engagement into one or more slotted hinge elements integrally molded to each of the longitudinally extending sections of said containment ridge thereby allowing pivotal movement of said side wall members from a vertical position to a horizontal folded down position over said floor mat, and said side wall members are provided with a series of open ended correspondingly positioned slots, said slots extending upwardly from approximately midway of said side wall members and through the top edges thereof;
- a plurality of dividers of relatively rigid material and similarly shaped, for slidable fit by a downward movement into said correspondingly positioned slots provided on said side wall members, said dividers transversely bridging the respective side wall members, forming compartments for the reception therein of filled bags of groceries; and having the opposite ends of each such divider exhibiting in cross section an "H" shaped configuration, formed of two opposed pairs of wing-like sections spaced apart at least the thickness of said side wall members by a centrally located membrane, said membrane approximating dimensionally in length and in width, as the said slots, for slidable fit therein, for supporting said dividers in a suspended position extending no lower than approximately half the depth of said side wall members, leaving the lower portion of said collapsible grocery bag holder unobstructed for accommodating overly stuffed bags of groceries; and wherein the opposed said winged sections straddingly engage, in the immediate area of said slots, their respective said side wall members, thereby preventing lateral movement thereof, and securing said side wall members in an upright, vertical operative position;
- and wherein said side wall members with said dividers in place, as an assembled unit, being readily detachable from said floor mat for placement in a less obstructive location within the luggage compartment to accommodate, when necessary, extra bulky cargo.

* * * * *